(12) United States Patent
Maeno et al.

(10) Patent No.: US 12,365,036 B2
(45) Date of Patent: Jul. 22, 2025

(54) CUTTING INSERT

(71) Applicants: Sumitomo Electric Hardmetal Corp., Itami (JP); AISIN FUKUI Corporation, Echizen (JP)

(72) Inventors: Hideo Maeno, Itami (JP); Junya Okida, Itami (JP); Daichi Yamaguchi, Echizen (JP)

(73) Assignees: SUMITOMO ELECTRIC HARDMETAL CORP., Itami (JP); AISIN FUKUI CORPORATION, Echizen (JP)

( * ) Notice: Subject to any disclaimer, the term of this patent is extended or adjusted under 35 U.S.C. 154(b) by 0 days.

(21) Appl. No.: 17/927,900

(22) PCT Filed: Oct. 21, 2021

(86) PCT No.: PCT/JP2021/038939
§ 371 (c)(1),
(2) Date: Nov. 28, 2022

(87) PCT Pub. No.: WO2023/067761
PCT Pub. Date: Apr. 27, 2023

(65) Prior Publication Data
US 2024/0227029 A1 Jul. 11, 2024

(51) Int. Cl.
*B26D 1/00* (2006.01)
*B23B 27/16* (2006.01)

(52) U.S. Cl.
CPC .............................. *B23B 27/1611* (2013.01)

(58) Field of Classification Search
CPC ................. B23B 27/1611; B23B 27/14; B23B 2200/201; B23B 2200/0423;
(Continued)

(56) References Cited

U.S. PATENT DOCUMENTS 3,490,117 A * 1/1970 Karl ..................... B23B 27/1614
407/104
4,294,566 A * 10/1981 Boone ................. B23B 27/1622
407/104
(Continued)

FOREIGN PATENT DOCUMENTS

CH 558693 A * 2/1975 .......... B23B 27/141
JP 857-27603 A 2/1982
(Continued)

*Primary Examiner* — Sara Addisu
(74) *Attorney, Agent, or Firm* — XSENSUS LLP

(57) ABSTRACT

A cutting insert includes a first surface, a second surface, and an outer peripheral side surface. A ridgeline between the first surface and the outer peripheral side surface forms a first ridgeline. A ridgeline between the second surface and the outer peripheral side surface forms a second ridgeline. The first ridgeline includes a first straight portion, a first wiper edge, a first corner cutting edge, and a second straight portion. The second ridgeline includes a third straight portion, a second wiper edge, a second corner cutting edge, and a fourth straight portion. The outer peripheral side surface includes a first wiper flank surface, a first corner flank surface, a second wiper flank surface, a second corner flank surface, a first plane, and a second plane. The first plane is contiguous to each of the first corner flank surface and the second wiper flank surface.

10 Claims, 21 Drawing Sheets

(58) Field of Classification Search
CPC ........ B23B 2200/049; B23B 2200/125; B23B 2200/204; B23B 2200/3681; B23C 5/06; B23C 5/202; B23C 2200/203; B23C 2200/126; B23C 2200/128
See application file for complete search history.

(56) References Cited

U.S. PATENT DOCUMENTS

| | | | | |
|---|---|---|---|---|
| 4,616,962 | A * | 10/1986 | Ushijima | B23C 5/202 407/113 |
| 4,681,488 | A * | 7/1987 | Markusson | B23C 5/202 407/113 |
| 5,365,805 | A * | 11/1994 | Pantzar | B23P 15/28 76/101.1 |
| 5,454,670 | A * | 10/1995 | Noda | B23C 5/202 407/42 |
| 8,496,415 | B2 * | 7/2013 | Zitzlaff | B23B 27/145 407/113 |
| 9,266,175 | B2 * | 2/2016 | Jaeger | B23C 5/06 |
| 11,833,595 | B2 * | 12/2023 | Yamamoto | B23C 3/13 |
| 2004/0146365 | A1 | 7/2004 | Usui et al. | |
| 2005/0254908 | A1 * | 11/2005 | Norstrom | B23B 27/145 407/113 |
| 2006/0228179 | A1 * | 10/2006 | Alm | B23B 27/145 407/119 |
| 2008/0226403 | A1 | 9/2008 | Craig | |
| 2009/0155005 | A1 * | 6/2009 | Jansson | B23C 5/202 407/114 |
| 2014/0010605 | A1 * | 1/2014 | Smilovici | B23C 5/06 407/42 |
| 2014/0334890 | A1 * | 11/2014 | Takahashi | B23C 5/205 407/40 |
| 2016/0082528 | A1 * | 3/2016 | Ballas | B23C 5/06 407/48 |
| 2016/0214180 | A1 * | 7/2016 | Sasaki | B23B 27/141 |
| 2017/0014919 | A1 * | 1/2017 | Kister | B23C 5/06 |
| 2018/0345383 | A1 | 12/2018 | Ikeda | |
| 2019/0054550 | A1 * | 2/2019 | Yoshida | B23C 5/109 |
| 2019/0176250 | A1 * | 6/2019 | Tsujimoto | B23C 5/202 |
| 2019/0232453 | A1 * | 8/2019 | Maeda | B24B 41/066 |
| 2019/0247931 | A1 * | 8/2019 | Fukuhara | B23B 27/143 |
| 2020/0023444 | A1 * | 1/2020 | Saitoh | B23C 5/06 |
| 2020/0276657 | A1 * | 9/2020 | Tabe | B23C 5/2213 |
| 2022/0203459 | A1 * | 6/2022 | Tsujimoto | B23C 5/109 |
| 2022/0266358 | A1 * | 8/2022 | Jung | B23C 5/202 |
| 2023/0294183 | A1 * | 9/2023 | Nishikoori | B23C 5/202 409/131 |
| 2023/0373019 | A1 * | 11/2023 | Nishikoori | B23C 5/202 |

FOREIGN PATENT DOCUMENTS

| | | | | |
|---|---|---|---|---|
| JP | 2004-237438 | A | | 8/2004 |
| JP | 2008018515 | A * | | 1/2008 |
| JP | 2014-121772 | A | | 7/2014 |
| JP | 2017-504495 | A | | 2/2017 |
| JP | 6744599 | B1 * | | 8/2020 ........... B23B 27/145 |
| JP | 2020-142357 | A | | 9/2020 |
| WO | WO-9416848 | A1 * | | 8/1994 ............ B23C 5/207 |
| WO | WO-0047405 | A1 * | | 8/2000 ........... B23B 27/143 |
| WO | 2004/002664 | A2 | | 1/2004 |
| WO | WO-2008155331 | A1 * | 12/2008 | ......... B23B 27/145 |
| WO | 2015/117733 | A1 | | 8/2015 |
| WO | WO-2016080486 | A1 * | | 5/2016 ............. B23C 5/06 |
| WO | 2017/090770 | A1 | | 6/2017 |
| WO | 2018/061227 | A1 | | 4/2018 |

* cited by examiner

CUTTING INSERT

CROSS-REFERENCE TO RELATED APPLICATION

The present application is based on PCT filing PCT/JP2021/038939, filed Oct. 21, 2021, the entire contents of which are incorporated herein by reference.

TECHNICAL FIELD

The present disclosure relates to a cutting insert.

BACKGROUND ART

WO 2018/061227 (PTL 1) discloses a cutting insert including a first end face and a second end face that are opposite to each other, a peripheral side surface extending so as to connect the first end face and the second end face, and a first cutting edge disposed at an intersecting ridge portion between the first end face and the peripheral side surface.

CITATION LIST

Patent Literature

PTL 1: WO 2018/061227

SUMMARY OF INVENTION

A cutting insert according to the present disclosure includes a first surface, a second surface, and an outer peripheral side surface. The second surface is located opposite to the first surface. The outer peripheral side surface is contiguous to each of the first surface and the second surface. A ridgeline between the first surface and the outer peripheral side surface forms a first ridgeline. A ridgeline between the second surface and the outer peripheral side surface forms a second ridgeline. The first ridgeline includes a first straight portion, a first wiper edge, a first corner cutting edge, and a second straight portion. The first wiper edge is contiguous to the first straight portion. The first corner cutting edge is located opposite to the first straight portion with respect to the first wiper edge. The second straight portion is contiguous to the first corner cutting edge. The second ridgeline includes a third straight portion, a second wiper edge, a second corner cutting edge, and a fourth straight portion. The second wiper edge is contiguous to the third straight portion. The second corner cutting edge is located opposite to the third straight portion with respect to the second wiper edge. The fourth straight portion is contiguous to the second corner cutting edge. The first ridgeline is located outward of the second ridgeline at the first corner cutting edge when viewed in a direction from the first surface toward the second surface. The second ridgeline is located outward of the first ridgeline at the second corner cutting edge when viewed in the direction from the first surface toward the second surface. The outer peripheral side surface includes a first wiper flank surface, a first corner flank surface, a second wiper flank surface, a second corner flank surface, a first plane, and a second plane. The first wiper flank surface is contiguous to the first wiper edge. The first corner flank surface is contiguous to the first corner cutting edge. The second wiper flank surface is contiguous to the second wiper edge. The second corner flank surface is contiguous to the second corner cutting edge. The first plane is contiguous to each of the first corner flank surface and the second wiper flank surface. The second plane is contiguous to each of the second corner flank surface and the first wiper flank surface. When viewed in the direction from the first surface toward the second surface, an outline formed by the first ridgeline and the second ridgeline that overlap each other is line-symmetric with respect to a bisector of an angle formed by a first virtual straight line extending in a direction in which the first straight portion extends and a second virtual straight line extending in a direction in which the second straight portion extends. When viewed in the direction from the first surface toward the second surface, a shape of each of the first surface and the second surface are two-fold or three-fold symmetric about a rotation center located on the bisector of the angle formed by the first virtual straight line and the second virtual straight line. Each of the first plane and the second plane extends along a direction perpendicular to the direction from the first surface toward the second surface.

DETAILED DESCRIPTION

Figure 1:
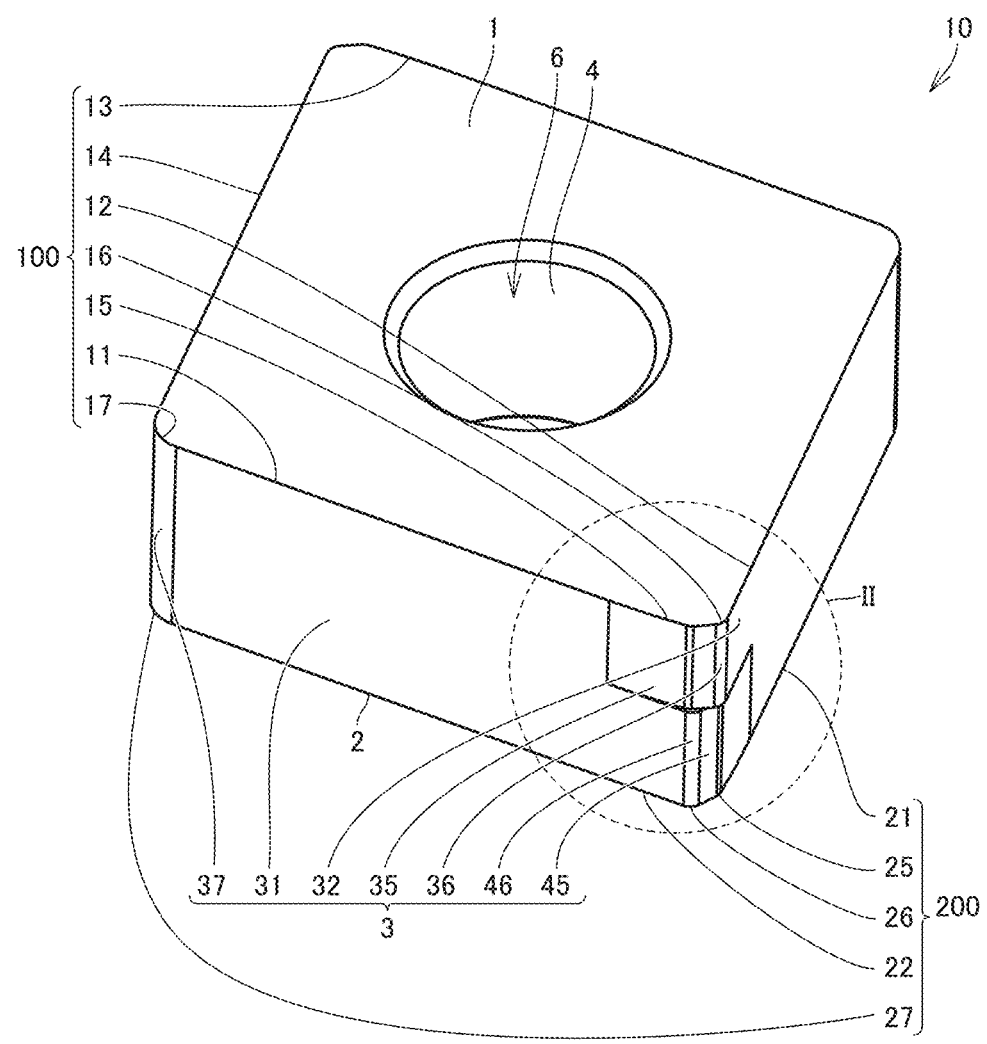
FIG. 1 is a schematic perspective view illustrating a configuration of a cutting insert according to a first embodiment.

Problem to be Solved by the Present Disclosure

The peripheral side surface of the cutting insert described in PTL 1 has a shape protruding outward. In order to manufacture the cutting insert, a multi-axis press and a die for the multi-axis press are required, and a manufacturing process becomes complicated. An object of the present disclosure is to provide the cutting insert that is easy to manufacture.

Advantageous Effect of the Present Disclosure

According to the present disclosure, the cutting insert that is easy to manufacture can be provided.

Description of Embodiments of the Present Disclosure

First, embodiments of the present disclosure will be listed and described.

(1) A cutting insert 10 according to the present disclosure includes a first surface 1, a second surface 2, and an outer peripheral side surface 3. Second surface 2 is located opposite to first surface 1. Outer peripheral side surface 3 is contiguous to each of first surface 1 and second surface 2. A ridgeline between first surface 1 and outer peripheral side surface 3 forms a first ridgeline 100. The ridgeline between second surface 2 and outer peripheral side surface 3 forms a second ridgeline 200. First ridgeline 100 includes a first straight portion 11, a first wiper edge 15, a first corner cutting edge 16, and a second straight portion 12. First wiper edge 15 is contiguous to first straight portion 11. First corner cutting edge 16 is located opposite to first straight portion 11 with respect to first wiper edge 15. Second straight portion 12 is contiguous to first corner cutting edge 16. Second ridgeline 200 includes a third straight portion 21, a second wiper edge 25, a second corner cutting edge 26, and a fourth straight portion 22. Second wiper edge 25 is contiguous to third straight portion 21. Second corner cutting edge 26 is located opposite to third straight portion 21 with respect to second wiper edge 25. Fourth straight portion 22 is contiguous to second corner cutting edge 26. When viewed in a direction from first surface 1 toward second surface 2, first ridgeline 100 is located outward of second ridgeline 200 at first corner cutting edge 16. When viewed in the direction from first surface 1 toward second surface 2, second ridgeline 200 is located outward of first ridgeline 100 at second corner cutting edge 26. Outer peripheral side surface 3 has a first wiper flank surface 35, a first corner flank surface 36, a second wiper flank surface 45, a second corner flank surface 46, a first plane 301, and a second plane 302. First wiper flank surface 35 is contiguous to first wiper edge 15. First corner flank surface 36 is contiguous to first corner cutting edge 16. Second wiper flank surface 45 is contiguous to second wiper edge 25. Second corner flank surface 46 is contiguous to second corner cutting edge 26. First plane 301 is contiguous to each of first corner flank surface 36 and second wiper flank surface 45. Second plane 302 is contiguous to each of second corner flank surface 46 and first wiper flank surface 35. When viewed in the direction from first surface 1 toward second surface 2, an outline formed by first ridgeline 100 and second ridgeline 200 that overlap each other is line-symmetric with respect to a bisector of an angle formed by a first virtual straight line 131 extending in a direction in which first straight portion 11 extends and a second virtual straight line 132 extending in a direction in which second straight portion 12 extends. When viewed in the direction from first surface 1 toward second surface 2, first virtual straight line 131 and second virtual straight line 132 are two-fold or three-fold symmetric about a rotation center 145 located on the bisector of an angle formed by first virtual straight line 131 and second virtual straight line 132. Each of first plane 301 and second plane 302 extends along a direction perpendicular to the direction from first surface 1 toward second surface 2.

(2) According to cutting insert 10 according to (1), when viewed in the direction from first surface 1 toward second surface 2, the shape of each of first surface 1 and second surface 2 may be two-fold symmetric about rotation center 145.

(3) According to cutting insert 10 according to (2), the angle formed by first virtual straight line 131 and second virtual straight line 132 may be greater than or equal to 75° and less than or equal to 85°.

(4) According to cutting insert 10 according to (1), the shape of each of first surface 1 and second surface 2 may be three-fold symmetric about rotation center 145 when viewed in the direction from first surface 1 toward second surface 2.

(5) According to cutting insert 10 according to (4), the angle formed by first virtual straight line 131 and second virtual straight line 132 may be greater than or equal to 75° and less than or equal to 85°.

(6) According to cutting insert 10 according to (3) or (5), first wiper edge 15 may have first wiper edge portion 121 and second wiper edge portion 122. First wiper edge portion 121 may be contiguous to first straight portion 11. Second wiper edge portion 122 may be contiguous to first corner cutting edge 16. When viewed in the direction from first surface 1 toward the second surface 2, first wiper edge portion 121 may be inclined with respect to first straight portion 11 in a direction from first straight portion 11 toward second straight portion 12. An inclination angle of first wiper edge portion 121 with respect to first straight portion 11 may be greater than or equal to 2° and less than or equal to 10°. When viewed in the direction from first surface 1 toward second surface 2, second wiper edge portion 122 may be inclined with respect to first wiper edge portion 121 in a direction from first wiper edge portion 121 toward second straight portion 12. An inclination angle of second wiper edge portion 122 with respect to first wiper edge portion 121 may be greater than or equal to 20° and less than or equal to 40°.

(7) According to cutting insert 10 according to (6), first wiper edge 15 may further include a first connection portion 123. First connection portion 123 may be contiguous to each of first wiper edge portion 121 and second wiper edge portion 122. Each of first corner cutting edge 16, first wiper edge portion 121, second wiper edge portion 122, and first connection portion 123 may have an arc shape. A curvature radius of first corner cutting edge 16 may be smaller than a curvature radius of second wiper edge portion 122. The curvature radius of second wiper edge portion 122 may be smaller than a curvature radius of first wiper edge portion 121. A curvature radius of first connection portion 123 may be smaller than the curvature radius of second wiper edge portion 122.

(8) According to cutting insert 10 according to (3), first wiper edge 15 may include first wiper edge portion 121 and second wiper edge portion 122. First wiper edge portion 121 may be contiguous to first straight portion 11. Second wiper edge portion 122 may be contiguous to first corner cutting edge 16. When viewed in the direction from first surface 1 toward the second surface 2, first wiper edge portion 121 may be inclined with respect to first straight portion 11 in the direction from first straight portion 11 toward second straight portion 12. The inclination angle of first wiper edge portion 121 with respect to first straight portion 11 may be greater than or equal to 2° and less than or equal to 10°. When viewed in the direction from first surface 1 toward second surface 2, second wiper edge portion 122 may be inclined with respect to first wiper edge portion 121 in the direction from first wiper edge portion 121 toward second straight portion 12. The inclination angle of second wiper edge portion 122 with respect to first wiper edge portion 121 may be greater than or equal to 20° and less than or equal to 40°. First wiper edge 15 may further include first connection portion 123. First connection portion 123 may be contiguous to each of first wiper edge portion 121 and second wiper edge portion 122. Each of first corner cutting edge 16, first wiper edge portion 121, second wiper edge portion 122, and first connection portion 123 may have an arc shape. The curvature radius of first corner cutting edge 16 may be smaller than the curvature radius of second wiper edge portion 122. The curvature radius of second wiper edge portion 122 may be smaller than the curvature radius of first wiper edge portion 121. The curvature radius of first connection portion 123 may be smaller than the curvature radius of second wiper edge portion 122.

Detailed Embodiments of the Present Disclosure

With reference to the drawings, details of embodiments of the present disclosure will be described below. In the drawings, the same or corresponding part is denoted by the same reference numeral, and the description will not be repeated.

First Embodiment

First, a configuration of cutting insert 10 according to a first embodiment of the present disclosure will be described.

FIG. 1 is a schematic perspective view illustrating the configuration of the cutting insert of the first embodiment. As illustrated in FIG. 1, cutting insert 10 mainly includes first surface 1, second surface 2, outer peripheral side surface 3, and inner circumferential surface 4. Second surface 2 is located opposite to first surface 1.

Outer peripheral side surface 3 is contiguous to each of first surface 1 and second surface 2. Outer peripheral side surface 3 is located between first surface 1 and second surface 2. Inner circumferential surface 4 is contiguous to each of first surface 1 and second surface 2. Inner circumferential surface 4 is located between first surface 1 and second surface 2. Outer peripheral side surface 3 is located outward of inner circumferential surface 4. Inner circumferential surface 4 forms a through-hole 6. Through-hole 6 penetrates first surface 1 and second surface 2. A ridgeline between first surface 1 and outer peripheral side surface 3 constitutes first ridgeline 100. At least a part of first ridgeline 100 functions as a cutting edge. First ridgeline 100 is annular. The ridgeline between second surface 2 and outer peripheral side surface 3 forms second ridgeline 200. At least a part of second ridgeline 200 functions as a cutting edge. Second ridgeline 200 is annular.

First ridgeline 100 mainly includes a first straight portion 11, a second straight portion 12, a fifth straight portion 13, a sixth straight portion 14, a first wiper edge 15, a first corner cutting edge 16, and a first corner portion 17. Fifth straight portion 13 is opposite to first straight portion 11. When viewed from inner circumferential surface 4, fifth straight portion 13 is located opposite to first straight portion 11. Inner circumferential surface 4 is located between first straight portion 11 and fifth straight portion 13. Sixth straight portion 14 is opposite to second straight portion 12. When viewed from inner circumferential surface 4, sixth straight portion 14 is located opposite to second straight portion 12. Inner circumferential surface 4 is located between second straight portion 12 and sixth straight portion 14.

First wiper edge 15 is contiguous to first straight portion 11. First corner cutting edge 16 is located opposite to first straight portion 11 with first wiper edge 15 interposed therebetween. From another point of view, first wiper edge 15 is located between first straight portion 11 and first corner cutting edge 16. For example, first corner cutting edge 16 is contiguous to first wiper edge 15. Second straight portion 12 is located opposite to first wiper edge 15 with first corner cutting edge 16 interposed therebetween. From another point of view, first corner cutting edge 16 is located between first wiper edge 15 and second straight portion 12. Second straight portion 12 is contiguous to first corner cutting edge 16. First corner portion 17 is contiguous to first straight portion 11. The first corner portion 17 is located opposite to the first straight portion 11 from the first wiper edge 15. From another point of view, first straight portion 11 is located between first wiper edge 15 and first corner portion 17. Sixth straight portion 14 is located opposite to first straight portion 11 with first corner portion 17 interposed therebetween. From another point of view, first corner portion 17 is located between first straight portion 11 and sixth straight portion 14. Sixth straight portion 14 is contiguous to first corner portion 17.

Second ridgeline 200 mainly includes a third straight portion 21, a second wiper edge 25, a second corner cutting edge 26, a fourth straight portion 22, and a second corner portion 27. Second wiper edge 25 is contiguous to third straight portion 21. Second corner cutting edge 26 is located opposite to third straight portion 21 with second wiper edge 25 interposed therebetween. From another point of view, second wiper edge 25 is located between third straight portion 21 and second corner cutting edge 26. For example, second corner cutting edge 26 is contiguous to second wiper edge 25. Fourth straight portion 22 is located opposite to second wiper edge 25 with second corner cutting edge 26 interposed therebetween. From another point of view, second corner cutting edge 26 is located between second wiper edge 25 and fourth straight portion 22. Fourth straight portion 22 is contiguous to second corner cutting edge 26. Second corner portion 27 is contiguous to fourth straight portion 22. Second corner portion 27 is located opposite to second corner cutting edge 26 with fourth straight portion 22 interposed therebetween. From another point of view, fourth straight portion 22 is located between second corner cutting edge 26 and second corner portion 27.

Outer peripheral side surface 3 mainly includes a first side surface 31, a second side surface 32, and a corner side surface 37. For example, first side surface 31 has a planar shape. First side surface 31 is contiguous to each of first straight portion 11 and fourth straight portion 22. For example, second side surface 32 has a planar shape. Second side surface 32 is contiguous to each of second straight portion 12 and third straight portion 21. Corner side surface 37 is contiguous to each of first corner portion 17 and second corner portion 27. In the circumferential direction, corner side surface 37 is contiguous to first side surface 31. Corner side surface 37 has a curved surface shape.

Figure 2:
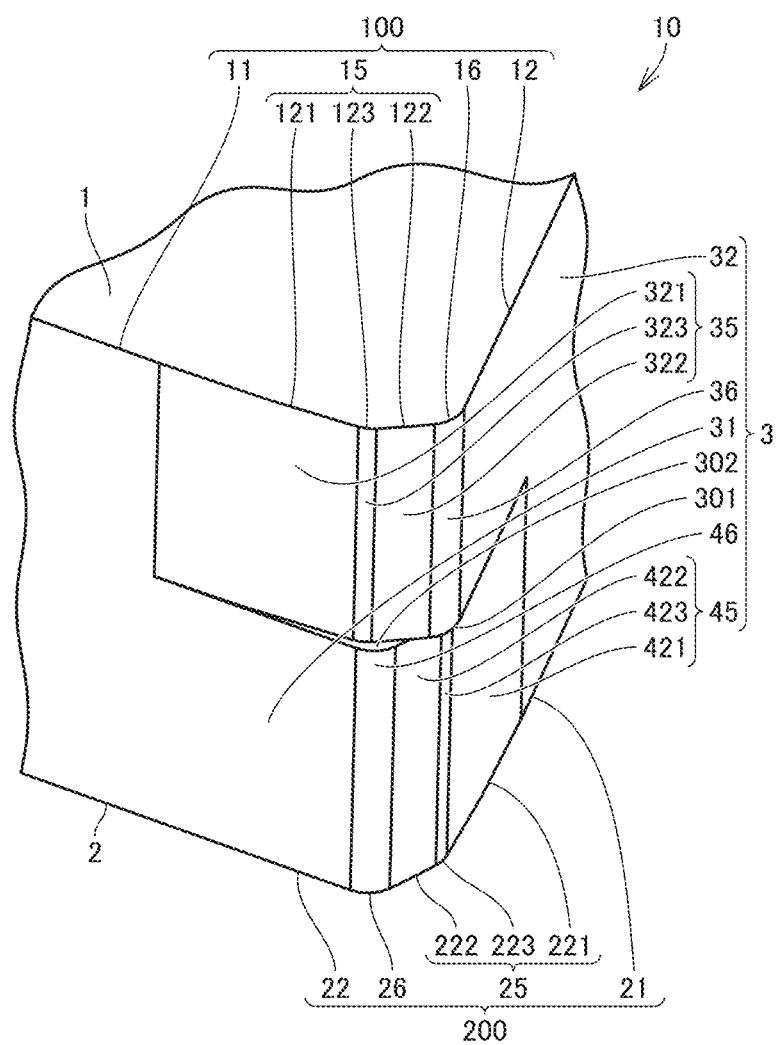
FIG. 2 is an enlarged perspective view schematically illustrating a region II in FIG. 1.

FIG. 2 is an enlarged perspective view schematically illustrating a region II in FIG. 1. As illustrated in FIG. 2, for example, first wiper edge 15 includes first wiper edge portion 121, second wiper edge portion 122, and first connection portion 123. First wiper edge portion 121 is contiguous to first straight portion 11. Second wiper edge portion 122 is contiguous to first corner cutting edge 16. First connection portion 123 is contiguous to each of first wiper edge portion 121 and second wiper edge portion 122. First connection portion 123 is located between first wiper edge portion 121 and second wiper edge portion 122.

For example, second wiper edge 25 includes a third wiper edge portion 221, a fourth wiper edge portion 222, and a second connection portion 223. Third wiper edge portion 221 is contiguous to third straight portion 21. Fourth wiper edge portion 222 is contiguous to second corner cutting edge 26. Second connection portion 223 is contiguous to each of third wiper edge portion 221 and fourth wiper edge portion 222. Second connection portion 223 is located between third wiper edge portion 221 and fourth wiper edge portion 222.

Outer peripheral side surface 3 has a first wiper flank surface 35, first corner flank surface 36, second wiper flank surface 45, second corner flank surface 46, first plane 301, and second plane 302. First wiper flank surface 35 is contiguous to first wiper edge 15. First corner flank surface 36 is contiguous to first corner cutting edge 16. Second wiper flank surface 45 is contiguous to second wiper edge 25. Second corner flank surface 46 is contiguous to second corner cutting edge 26. Each of first wiper flank surface 35, first corner flank surface 36, second wiper flank surface 45, and second corner flank surface 46 extends along the direction from first surface 1 toward second surface 2.

In the circumferential direction, first wiper flank surface 35 is contiguous to each of first side surface 31 and first corner flank surface 36. First corner flank surface 36 is located opposite to first side surface 31 with first wiper flank surface 35 interposed therebetween. From another point of view, first wiper flank surface 35 is located between first side surface 31 and first corner flank surface 36. First corner flank surface 36 is contiguous to second side surface 32. Second side surface 32 is located opposite to first wiper flank surface 35 with first corner flank surface 36 interposed therebetween. From another point of view, first corner flank surface 36 is located between first wiper flank surface 35 and second side surface 32.

In the circumferential direction, second wiper flank surface 45 is contiguous to each of second side surface 32 and second corner flank surface 46. Second corner flank surface 46 is located opposite to second side surface 32 with second wiper flank surface 45 interposed therebetween. From another point of view, second wiper flank surface 45 is located between second side surface 32 and second corner flank surface 46. Second corner flank surface 46 is contiguous to first side surface 31. First side surface 31 is located opposite to second wiper flank surface 45 with second corner flank surface 46 interposed therebetween. From another point of view, second corner flank surface 46 is located between second wiper flank surface 45 and first side surface 31.

For example, each of first wiper flank surface 35, first corner flank surface 36, second wiper flank surface 45, and second corner flank surface 46 has a curved surface shape. For example, each of first wiper flank surface 35, first corner flank surface 36, second wiper flank surface 45, and second corner flank surface 46 may be a curved surface protruding outward. In the present specification, outward is the direction from inner circumferential surface 4 toward outer peripheral side surface 3.

First plane 301 is contiguous to each of first corner flank surface 36 and second wiper flank surface 45. First plane 301 may be contiguous to first wiper flank surface 35. First plane 301 may be contiguous to second side surface 32. Second plane 302 is contiguous to each of second corner flank surface 46 and first wiper flank surface 35. Second plane 302 may be contiguous to second wiper flank surface 45. Second plane 302 may be contiguous to first side surface 31. Second plane 302 may be contiguous to first plane 301.

First wiper flank surface 35 includes a first wiper flank portion 321, a second wiper flank portion 322, and a first connection surface 323. First wiper flank portion 321 is contiguous to first wiper edge portion 121. For example, first wiper flank portion 321 is contiguous to second plane 302. Second wiper flank portion 322 is contiguous to second wiper edge portion 122. For example, second wiper flank portion 322 is contiguous to each of first plane 301 and second plane 302. First connection surface 323 is contiguous to first connection portion 123. For example, first connection surface 323 is contiguous to second plane 302.

In the circumferential direction, first wiper flank portion 321 is contiguous to first side surface 31. Second wiper flank portion 322 is contiguous to first corner flank surface 36. First connection surface 323 is contiguous to each of first wiper flank portion 321 and second wiper flank portion 322. First connection surface 323 is located between first wiper flank portion 321 and second wiper flank portion 322. For example, each of first wiper flank portion 321, second wiper flank portion 322, and first connection surface 323 has a curved surface shape. Each of first wiper flank portion 321, second wiper flank portion 322, and first connection surface 323 may be a curved surface protruding outward.

Second wiper flank surface 45 includes a third wiper flank portion 421, a fourth wiper flank portion 422, and a second connection surface 423. Third wiper flank portion 421 is contiguous to third wiper edge portion 221. For example, third wiper flank portion 421 is contiguous to first plane 301. Fourth wiper flank portion 422 is contiguous to fourth wiper edge portion 222. For example, fourth wiper flank portion 422 is contiguous to each of first plane 301 and second plane 302. Second connection surface 423 is contiguous to second connection portion 223. For example, second connection surface 423 is contiguous to first plane 301.

In the circumferential direction, third wiper flank portion 421 is contiguous to second side surface 32. Fourth wiper flank portion 422 is contiguous to second corner flank surface 46. Second connection surface 423 is contiguous to each of third wiper flank portion 421 and fourth wiper flank portion 422. Second connection surface 423 is located between third wiper flank portion 421 and fourth wiper flank portion 422. For example, each of third wiper flank portion 421, fourth wiper flank portion 422, and second connection surface 423 has a curved surface shape. Each of third wiper flank portion 421, fourth wiper flank portion 422, and second connection surface 423 may be a curved surface protruding outward.

Figure 3:
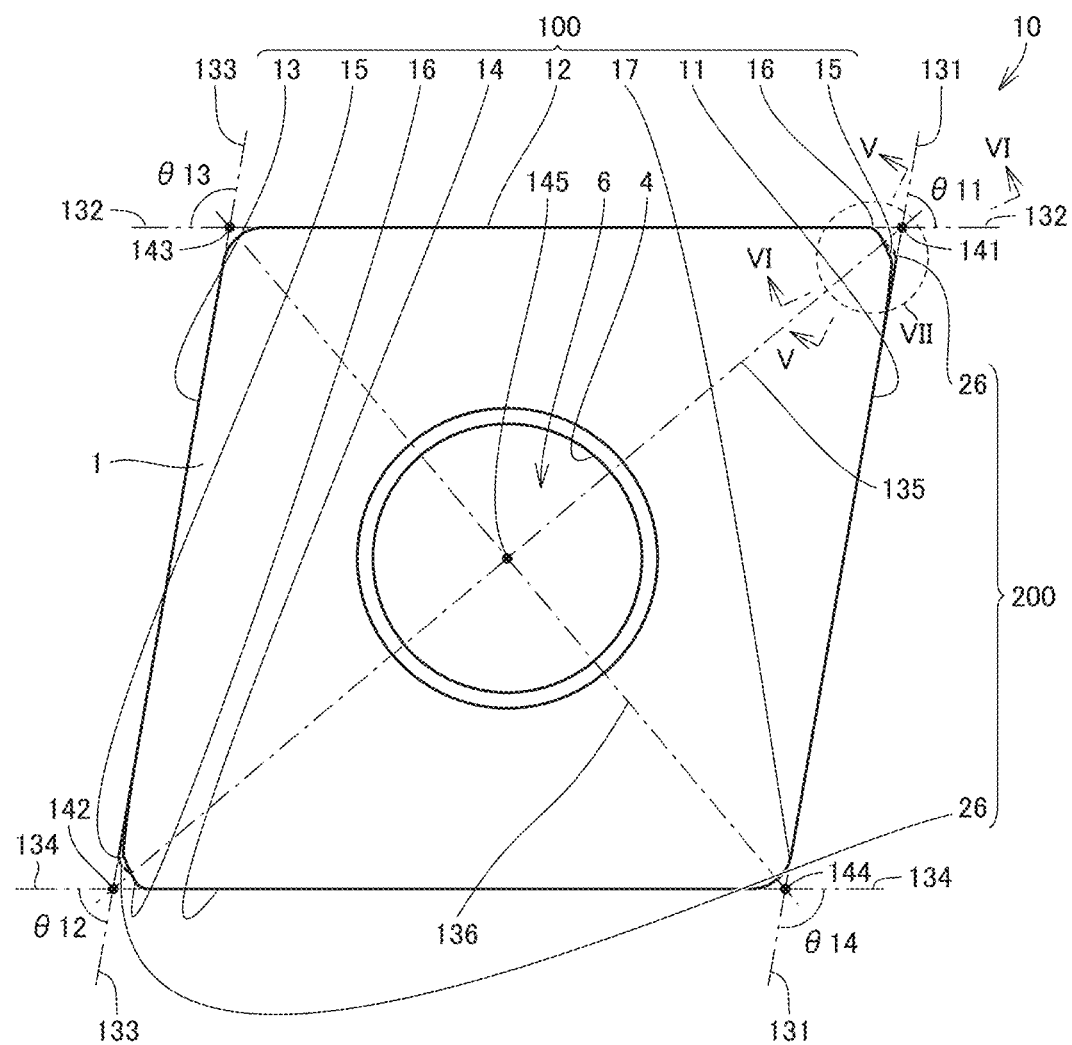
FIG. 3 is a schematic front view illustrating the configuration of the cutting insert of the first embodiment.

FIG. 3 is a schematic front view illustrating the configuration of cutting insert 10 of the first embodiment. The schematic front view in FIG. 3 is a schematic front view when viewed in the direction from first surface 1 toward second surface 2 of cutting insert 10.

As illustrated in FIG. 3, first ridgeline 100 is a substantially parallelogram when viewed from first surface 1 toward second surface 2. Fifth straight portion 13 is substantially parallel to first straight portion 11. Sixth straight portion 14 is substantially parallel to second straight portion 12. First straight portion 11 is inclined with respect to second straight portion 12. Second straight portion 12 is inclined with respect to fifth straight portion 13. Fifth straight portion 13 is inclined with respect to sixth straight portion 14. Sixth straight portion 14 is inclined with respect to first straight portion 11.

When viewed in the direction from first surface 1 toward second surface 2, first wiper edge 15 has a curved shape. First wiper edge 15 has a shape protruding outward. When viewed in the direction from first surface 1 toward second surface 2, first corner cutting edge 16 has a curved shape. First corner cutting edge 16 has a shape protruding outward. When viewed in the direction from first surface 1 toward second surface 2, first corner portion 17 has a curved shape. First corner portion 17 has a shape protruding outward.

As illustrated in FIG. 3, a virtual straight line extending in the direction in which first straight portion 11 extends is defined as first virtual straight line 131. A virtual straight line extending in the direction in which the second straight portion 12 extends is defined as second virtual straight line 132. First virtual straight line 131 and second virtual straight line 132 intersect with each other at a first intersection point 141. A virtual straight line extending in the direction in which the fifth straight portion 13 extends is defined as a third virtual straight line 133. A virtual straight line extending in the direction in which sixth straight portion 14 extends is defined as a fourth virtual straight line 134. Third virtual straight line 133 and fourth virtual straight line 134 intersect with each other at a second intersection point 142.

The bisector of the angle formed by first virtual straight line 131 and second virtual straight line 132 is defined as a fifth virtual straight line 135. Fifth virtual straight line 135 passes through first intersection point 141 and second intersection point 142. Fifth virtual straight line 135 is the bisector of the angle formed by third virtual straight line 133 and fourth virtual straight line 134. When viewed in the direction from first surface 1 toward second surface 2, the outline formed by first ridgeline 100 and second ridgeline 200 that overlap each other is line-symmetric with respect to fifth virtual straight line 135. The outline formed by first ridgeline 100 and second ridgeline 200 that overlap each other is a line obtained by extracting a line located outward among lines formed by first ridgeline 100 and second ridgeline 200 that overlap each other.

A midpoint of a line segment connecting first intersection point 141 and second intersection point 142 is defined as rotation center 145. Rotation center 145 is located on fifth virtual straight line 135. In other words, fifth virtual straight line 135 passes through rotation center 145. When viewed in the direction from first surface 1 toward second surface 2, rotation center 145 may be located at the center of inner circumferential surface 4. When viewed in the direction from first surface 1 toward second surface 2, the shape of first surface 1 is two-fold symmetry about rotation center 145. From another point of view, a shape obtained by rotating the outer shape of first surface 1 by 180° around rotation center 145 is matched with the outer shape of first surface 1.

As illustrated in FIG. 3, in first ridgeline 100, two first wiper edges 15 may be provided at positions rotated by 180° about rotation center 145. Similarly, in first ridgeline 100, two first corner cutting edges 16 may be provided at positions rotated by 180° about rotation center 145. Similarly, in first ridgeline 100, two first corner portions 17 may be provided at positions rotated by 180° about rotation center 145. When viewed in the direction from first surface 1 toward second surface 2, first ridgeline 100 is asymmetric with respect to fifth virtual straight line 135. Specifically, each of first corner cutting edge 16 and first wiper edge 15 in first ridgeline 100 is asymmetric with respect to fifth virtual straight line 135.

As illustrated in FIG. 3, second virtual straight line 132 and third virtual straight line 133 intersect with each other at a third intersection point 143. First virtual straight line 131 and fourth virtual straight line 134 intersect with each other at a fourth intersection point 144. The bisector of the angle formed by second virtual straight line 132 and third virtual straight line 133 is defined as a sixth virtual straight line 136. Sixth virtual straight line 136 passes through each of third intersection point 143, rotation center 145, and fourth intersection point 144. From another point of view, fifth virtual straight line 135 and sixth virtual straight line 136 intersect with each other at rotation center 145. When viewed in the direction from first surface 1 toward second surface 2, first ridgeline 100 is asymmetric with respect to sixth virtual straight line 136. Specifically, each of first corner cutting edge 16 and first wiper edge 15 in first ridgeline 100 is asymmetric with respect to sixth virtual straight line 136.

When viewed in the direction from first surface 1 toward second surface 2, an angle formed by first virtual straight line 131 and second virtual straight line 132 is defined as a first angle $\theta 11$. An angle formed by third virtual straight line 133 and fourth virtual straight line 134 is defined as a second angle $\theta 12$. First angle $\theta 11$ and second angle $\theta 12$ are the same. For example, first angle $\theta 11$ is 80°. For example, first angle $\theta 11$ may be greater than or equal to 75° and less than or equal to 85°. The lower limit of first angle $\theta 11$ is not particularly limited, but for example, may be greater than or equal to 77° or greater than or equal to 79°. The upper limit of first angle $\theta 11$ is not particularly limited, but for example, may be less than or equal to 83° or less than or equal to 81°. Similarly, for example, second angle $\theta 12$ is 80°. For example, second angle $\theta 12$ may be greater than or equal to 75° and less than or equal to 85°. The lower limit of the second angle $\theta 12$ is not particularly limited, but for example, may be greater than or equal to 77° or greater than or equal to 79°. The upper limit of second angle $\theta 12$ is not particularly limited, but for example, may be less than or equal to 830 or less than or equal to 81°.

When viewed in the direction from first surface 1 toward second surface 2, an angle formed by second virtual straight line 132 and third virtual straight line 133 is defined as a third angle $\theta 13$. An angle formed by first virtual straight line 131 and fourth virtual straight line 134 is defined as a fourth angle $\theta 14$. Third angle $\theta 13$ and fourth angle $\theta 14$ are the same. For example, third angle $\theta 13$ is greater than or equal to 95° and less than or equal to 105°. The lower limit of third angle $\theta 13$ is not particularly limited, but for example, may be greater than or equal to 97° or greater than or equal to 99°. The upper limit of third angle $\theta 13$ is not particularly limited, but for example, may be less than or equal to 103° or less than or equal to 101°. Similarly, for example, fourth angle $\theta 14$ is greater than or equal to 95° and less than or equal to 105°. The lower limit of fourth angle $\theta 14$ is not particularly limited, but for example, may be greater than or equal to 97° or greater than or equal to 99°. The upper limit of fourth angle $\theta 14$ is not particularly limited, but for example, may be less than or equal to 103° or less than or equal to 101°. Third angle $\theta 13$ may be larger than first angle $\theta 11$.

Figure 4:
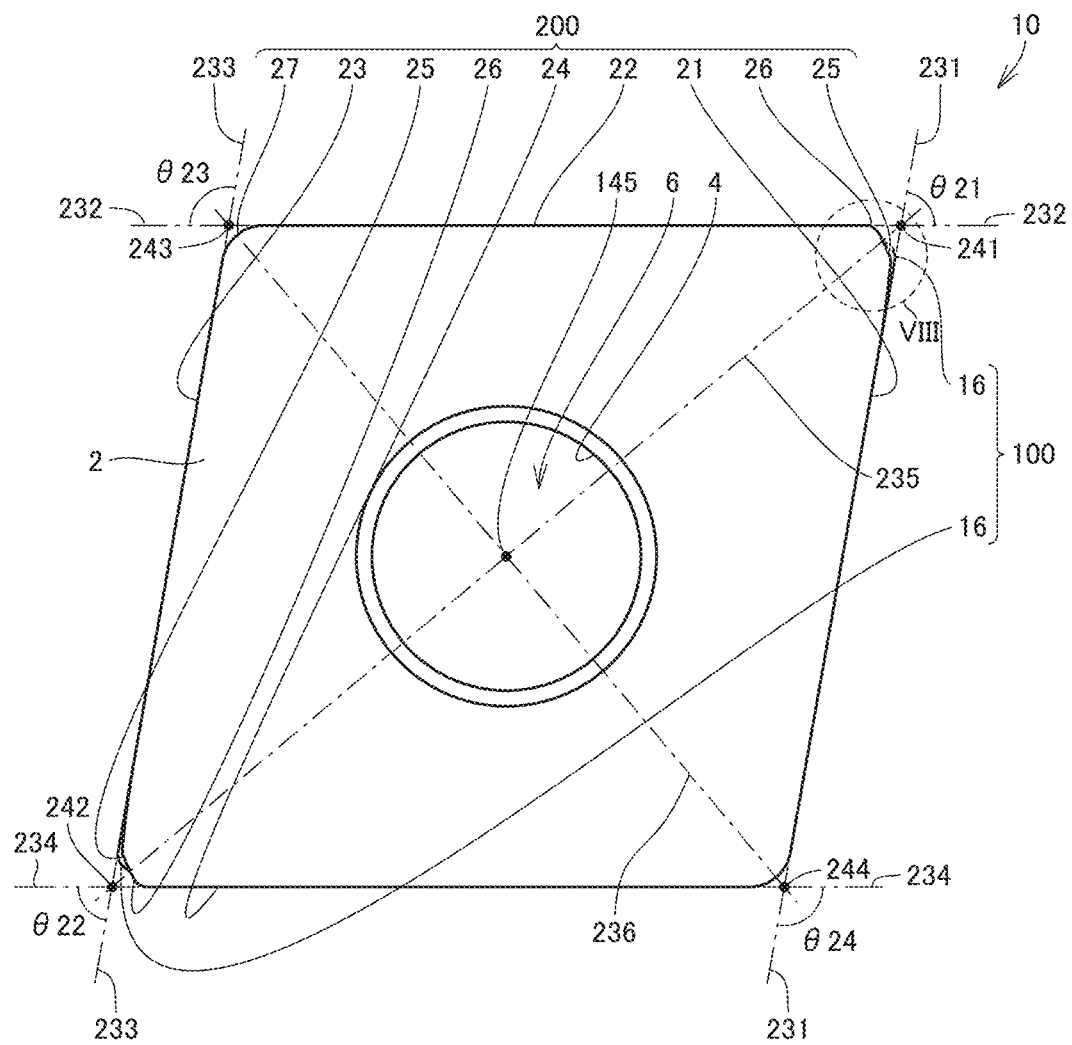
FIG. 4 is a schematic rear view illustrating the configuration of the cutting insert of the first embodiment.

FIG. 4 is a schematic rear view illustrating the configuration of cutting insert 10 of the first embodiment. The schematic rear view in FIG. 4 is a schematic rear view of cutting insert 10 when viewed in the direction from second surface 2 toward first surface 1.

As illustrated in FIG. 4, second ridgeline 200 is a substantially parallelogram when viewed from second surface 2 toward first surface 1. Second ridgeline 200 further includes a seventh straight portion 23 and an eighth straight portion 24. Seventh straight portion 23 is opposite to third straight portion 21. Eighth straight portion 24 is opposite to fourth straight portion 22. Seventh straight portion 23 is substantially parallel to third straight portion 21. Eighth straight portion 24 is substantially parallel to fourth straight portion 22. Third straight portion 21 is inclined with respect to fourth straight portion 22. Fourth straight portion 22 is inclined with respect to seventh straight portion 23. Seventh straight portion 23 is inclined with respect to eighth straight portion 24. Eighth straight portion 24 is inclined with respect to third straight portion 21. Seventh straight portion 23 is contiguous to second corner portion 27. Seventh straight portion 23 is located opposite to fourth straight portion 22 with second corner portion 27 interposed therebetween. From another point of view, second corner portion 27 is located between fourth straight portion 22 and seventh straight portion 23.

When viewed in the direction from second surface 2 toward first surface 1, second wiper edge 25 has a curved shape. Second wiper edge 25 has a shape protruding outward. When viewed in the direction from second surface 2 toward first surface 1, second corner cutting edge 26 has a curved shape. Second corner cutting edge 26 has a shape protruding outward. When viewed in the direction from second surface 2 toward first surface 1, second corner portion 27 has a curved shape. Second corner portion 27 has a shape protruding outward.

As illustrated in FIG. 4, a virtual straight line extending in the direction in which third straight portion 21 extends is defined as a seventh virtual straight line 231. A virtual straight line extending in the direction in which fourth straight portion 22 extends is defined as an eighth virtual straight line 232. Seventh virtual straight line 231 and eighth virtual straight line 232 intersect with each other at a fifth intersection point 241. A virtual straight line extending in the direction in which seventh straight portion 23 extends is defined as a ninth virtual straight line 233. A virtual straight line extending in the direction in which eighth straight portion 24 extends is defined as a tenth virtual straight line 234. Ninth virtual straight line 233 and tenth virtual straight line 234 intersect with each other at a sixth intersection point 242.

The bisector of the angle formed by seventh virtual straight line 231 and eighth virtual straight line 232 is defined as an eleventh virtual straight line 235. Eleventh virtual straight line 235 passes through fifth intersection point 241 and sixth intersection point 242. Eleventh virtual straight line 235 is the bisector of the angle formed by ninth virtual straight line 233 and tenth virtual straight line 234. When viewed in the direction from second surface 2 toward first surface 1, the outline formed by first ridgeline 100 and second ridgeline 200 that overlap each other is line-symmetric with respect to eleventh virtual straight line 235.

When viewed in the direction from second surface 2 toward first surface 1, rotation center 145 is located at a midpoint of a line segment connecting fifth intersection point 241 and sixth intersection point 242. When viewed in the direction from second surface 2 toward first surface 1, rotation center 145 is located on eleventh virtual straight line 235. When viewed in the direction from second surface 2 toward first surface 1, the shape of second surface 2 is two-fold symmetric about rotation center 145. Similarly, when viewed in the direction from first surface 1 toward second surface 2, the shape of second surface 2 is two-fold symmetric about rotation center 145. From another point of view, the shape obtained by rotating the outer shape of second surface 2 by 180° around rotation center 145 is matched with the outer shape of second surface 2.

As illustrated in FIG. 4, in second ridgeline 200, two second wiper edges 25 may be provided at positions rotated by 180° about rotation center 145. Similarly, in second ridgeline 200, two second corner cutting edges 26 may be provided at positions rotated by 180° about rotation center 145. Similarly, in second ridgeline 200, two second corner portions 27 may be provided at positions rotated by 180° about rotation center 145. When viewed in the direction from second surface 2 toward first surface 1, second ridgeline 200 is asymmetric with respect to eleventh virtual straight line 235. Specifically, each of second corner cutting edge 26 and second wiper edge 25 in second ridgeline 200 is asymmetric with respect to eleventh virtual straight line 235.

As illustrated in FIG. 4, eighth virtual straight line 232 and ninth virtual straight line 233 intersect with each other at a seventh intersection point 243. Seventh virtual straight line 231 and tenth virtual straight line 234 intersect with each other at an eighth intersection point 244. The bisector of the angle formed by eighth virtual straight line 232 and ninth virtual straight line 233 is defined as a twelfth virtual straight line 236. When viewed in the direction from second surface 2 toward first surface 1, twelfth virtual straight line 236 passes through seventh intersection point 243, rotation center 145, and eighth intersection point 244. When viewed in the direction from second surface 2 toward first surface 1, eleventh virtual straight line 235 and twelfth virtual straight line 236 intersect with each other at rotation center 145. When viewed in the direction from second surface 2 toward first surface 1, second ridgeline 200 is asymmetric with respect to twelfth virtual straight line 236. Specifically, each of second corner cutting edge 26 and second wiper edge 25 in second ridgeline 200 is asymmetric with respect to twelfth virtual straight line 236.

When viewed in the direction from second surface 2 toward first surface 1, an angle formed by seventh virtual straight line 231 and eighth virtual straight line 232 is defined as a fifth angle $\theta 21$. An angle formed by ninth virtual straight line 233 and tenth virtual straight line 234 is defined as a sixth angle $\theta 22$. Fifth angle $\theta 21$ and sixth angle $\theta 22$ are the same. For example, fifth angle $\theta 21$ is 80°. For example, fifth angle $\theta 21$ may be greater than or equal to 75° and less than or equal to 85°. The lower limit of fifth angle $\theta 21$ is not particularly limited, but for example, may be greater than or equal to 77° or greater than or equal to 79°. The upper limit of fifth angle $\theta 21$ is not particularly limited, but for example, may be less than or equal to 83° or less than or equal to 81°. Similarly, for example, sixth angle $\theta 22$ is 80°. For example, sixth angle $\theta 22$ may be greater than or equal to 75° and less than or equal to 85°. The lower limit of sixth angle $\theta 22$ is not particularly limited, but for example, may be greater than or equal to 77° or greater than or equal to 79°. The upper limit of the sixth angle $\theta 22$ is not particularly limited, but for example, may be less than or equal to 83° or less than or equal to 81°.

When viewed from second surface 2 toward first surface 1, an angle formed by eighth virtual straight line 232 and ninth virtual straight line 233 is defined as a seventh angle $\theta 23$. An angle formed by seventh virtual straight line 231 and tenth virtual straight line 234 is defined as an eighth angle θ24. Seventh angle θ23 and eighth angle θ24 are the same. For example, seventh angle θ23 is greater than or equal to 95° and less than or equal to 105°. The lower limit of seventh angle θ23 is not particularly limited, but for example, may be greater than or equal to 97° or greater than or equal to 99°. The upper limit of seventh angle θ23 is not particularly limited, but for example, may be less than or equal to 103° or less than or equal to 101°. Similarly, for example, eighth angle θ24 is greater than or equal to 95° and less than or equal to 105°. The lower limit of eighth angle θ24 is not particularly limited, but for example, may be greater than or equal to 97° or greater than or equal to 99°. The upper limit of eighth angle θ24 is not particularly limited, but for example, may be less than or equal to 103° or less than or equal to 101°. Seventh angle θ23 may be larger than fifth angle θ21.

Figure 5:
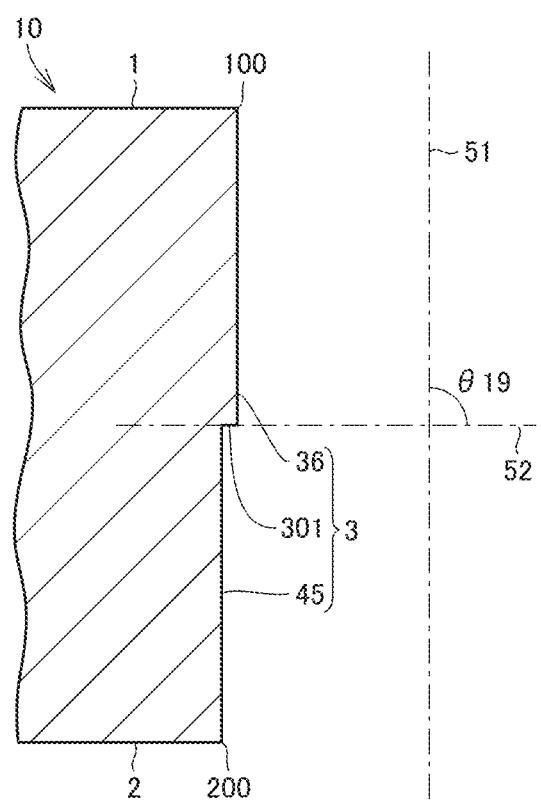
FIG. 5 is a schematic longitudinal sectional view taken along a line V-V in FIG. 3.

FIG. 5 is a schematic longitudinal sectional view taken along a line V-V in FIG. 3. The section in FIG. 5 is perpendicular to first surface 1 and intersects with each of first corner flank surface 36, second wiper flank surface 45, and first plane 301. As illustrated in FIG. 5, for example, first surface 1 is disposed in parallel with second surface 2. In the sectional view, first corner flank surface 36 is located outward of second wiper flank surface 45. A virtual straight line parallel to the direction from first surface 1 toward second surface 2 is defined as a thirteenth virtual straight line 51. In the sectional view, a virtual straight line extending in a direction perpendicular to thirteenth virtual straight line 51 is defined as a fourteenth virtual straight line 52. In other words, in the sectional view, the angle (ninth angle θ19) formed by thirteenth virtual straight line 51 and fourteenth virtual straight line 52 is 90°.

In the sectional view, first plane 301 extends in the direction along fourteenth virtual straight line 52. That is, first plane 301 extends along the direction perpendicular to the direction from first surface 1 toward second surface 2. The direction along the direction perpendicular to the direction from first surface 1 toward second surface 2 may be a direction substantially perpendicular to the direction from first surface 1 toward second surface 2, but is not limited to the direction completely perpendicular to the direction from first surface 1 toward second surface 2. The case where first plane 301 extends along the direction perpendicular to the direction from first surface 1 toward second surface 2 includes the case where first plane 301 is inclined by an angle within ±3° with respect to the direction perpendicular to the direction from first surface 1 toward second surface 2. In other words, in the sectional view, the inclination angle of first plane 301 with respect to fourteenth virtual straight line 52 may be within ±3°. For example, first plane 301 may be slightly inclined with respect to fourteenth virtual straight line 52 due to a machining error or the like generated during grinding. In the sectional view, when first plane 301 is inclined so as to approach first surface 1 as the distance from second wiper flank surface 45 increases, it is assumed that the inclination angle of first plane 301 with respect to fourteenth virtual straight line 52 is positive. On the other hand, in the sectional view, when first plane 301 is inclined so as to be away from first surface 1 as the distance from second wiper flank surface 45 increases, it is assumed that the inclination angle of first plane 301 with respect to fourteenth virtual straight line 52 is negative.

Figure 6:
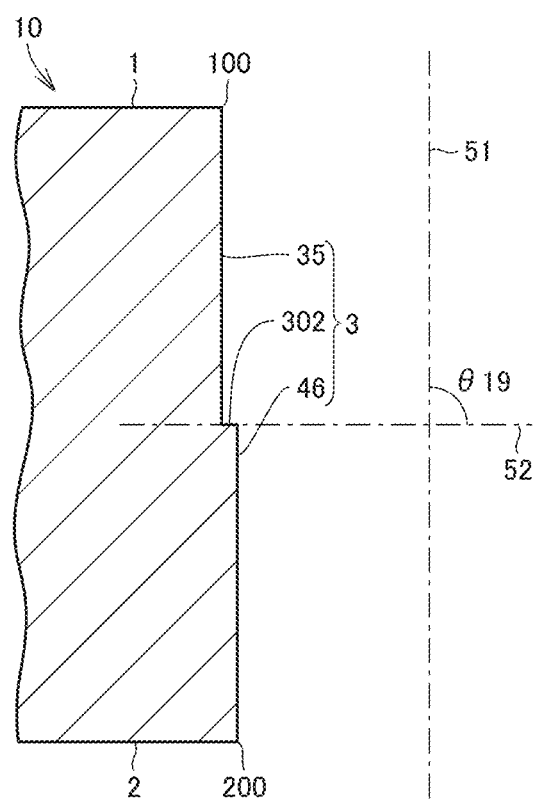
FIG. 6 is a schematic longitudinal sectional view taken along a line VI-VI in FIG. 3.

FIG. 6 is a schematic longitudinal sectional view taken along a line VI-VI in FIG. 3. The section in FIG. 6 is perpendicular to first surface 1 and intersects with each of second corner flank surface 46, first wiper flank surface 35, and second plane 302. As illustrated in FIG. 6, in the sectional view, second corner flank surface 46 is located outward of first wiper flank surface 35. In the sectional view, second plane 302 extends in the direction along fourteenth virtual straight line 52. That is, second plane 302 extends along the direction perpendicular to the direction from first surface 1 toward second surface 2. The case where second plane 302 extends along the direction perpendicular to the direction from first surface 1 toward second surface 2 includes the case where second plane 302 is inclined by the angle within ±3° with respect to the direction perpendicular to the direction from first surface 1 toward second surface 2. In other words, in the sectional view, the inclination angle of second plane 302 with respect to fourteenth virtual straight line 52 may be within ±3°. For example, sometimes second plane 302 is slightly inclined with respect to fourteenth virtual straight line 52 due to a machining error or the like generated during the grinding or the like. In the sectional view, when second plane 302 is inclined so as to approach first surface 1 as the distance from first wiper flank surface 35 increases, it is assumed that the inclination angle of second plane 302 with respect to fourteenth virtual straight line 52 is positive. On the other hand, in the sectional view, when second plane 302 is inclined so as to be away from first surface 1 as the distance from first wiper flank surface 35 increases, it is assumed that the inclination angle of second plane 302 with respect to fourteenth virtual straight line 52 is negative.

Figure 7:
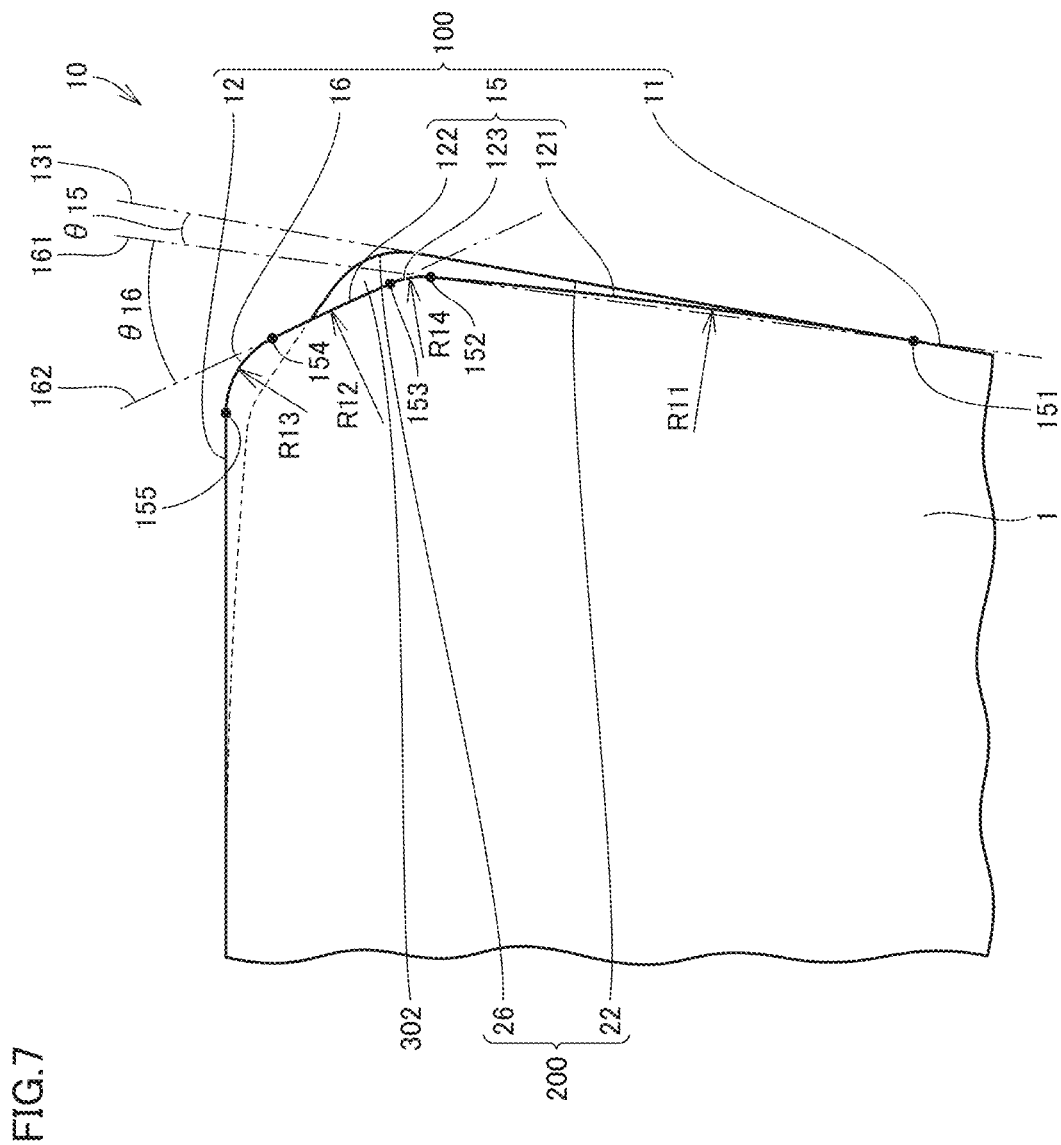
FIG. 7 is an enlarged front view schematically illustrating a region VII in FIG. 3 in an enlarged manner.

FIG. 7 is an enlarged front view schematically illustrating a region VII in FIG. 3 in an enlarged manner. As illustrated in FIG. 7, first wiper edge portion 121 is contiguous to first straight portion 11 at a first connection point 151. First connection portion 123 is contiguous to first wiper edge portion 121 at a second connection point 152. Second wiper edge portion 122 is contiguous to first connection portion 123 at a third connection point 153. First corner cutting edge 16 is contiguous to second wiper edge portion 122 at a fourth connection point 154. Second straight portion 12 is contiguous to first corner cutting edge 16 at a fifth connection point 155. When viewed in the direction from first surface 1 toward second surface 2, second ridgeline 200 is located outward of first ridgeline 100 at second corner cutting edge 26 of second ridgeline 200. When viewed in the direction from first surface 1 toward second surface 2, second ridgeline 200 may be located outward of first ridgeline 100 at fourth straight portion 22 of second ridgeline 200.

When viewed in the direction from first surface 1 toward second surface 2, for example, each of first wiper edge portion 121, second wiper edge portion 122, first corner cutting edge 16, and first connection portion 123 has an arc shape. For example, each of first wiper edge portion 121, second wiper edge portion 122, first corner cutting edge 16, and first connection portion 123 has a shape protruding outward. The curvature radius of first wiper edge portion 121 is defined as a first curvature radius R11. The curvature radius of second wiper edge portion 122 is defined as a second curvature radius R12. The curvature radius of first corner cutting edge 16 is defined as a third curvature radius R13. The curvature radius of first connection portion 123 is defined as a fourth curvature radius R14.

When viewed in the direction from first surface 1 toward second surface 2, second curvature radius R12 is smaller than first curvature radius R11. A value obtained by dividing first curvature radius R11 by second curvature radius R12 is defined as R11/R12. For example, R11/R12 is greater than or equal to 1.1 and less than or equal to 4. The lower limit of R11/R12 is not particularly limited, but for example, may be greater than or equal to 1.3 or greater than or equal to 1.5.

The upper limit of R11/R12 is not particularly limited, but for example, may be less than or equal to 3.5 or less than or equal to 3.

When viewed in the direction from first surface 1 toward second surface 2, third curvature radius R13 is smaller than second curvature radius R12. A value obtained by dividing second curvature radius R12 by third curvature radius R13 is defined as R12/R13. For example, R12/R13 is greater than or equal to 10 and less than or equal to 90. The lower limit of R12/R13 is not particularly limited, but for example, may be greater than or equal to 15 or greater than or equal to 20. The upper limit of R12/R13 is not particularly limited, but for example, may be less than or equal to 65 or less than or equal to 40.

When viewed in the direction from first surface 1 toward second surface 2, fourth curvature radius R14 is smaller than second curvature radius R12. A value obtained by dividing second curvature radius R12 by fourth curvature radius R14 is defined as R12/R14. For example, R12/R14 is greater than or equal to 10 and less than or equal to 90. The lower limit of R12/R14 is not particularly limited, but for example, may be greater than or equal to 15 or greater than or equal to 20. The upper limit of R12/R14 is not particularly limited, but for example, may be less than or equal to 65 or less than or equal to 40.

As illustrated in FIG. 7, a straight line passing through first connection point 151 and second connection point 152 is defined as a fifteenth virtual straight line 161. From another point of view, fifteenth virtual straight line 161 is a straight line passing through both ends of first wiper edge portion 121. An inclination angle of fifteenth virtual straight line 161 with respect to first virtual straight line 131 is defined as a first inclination angle $\theta15$. In other words, first inclination angle $\theta15$ is an inclination angle of fifteenth virtual straight line 161 with respect to first straight portion 11. First inclination angle $\theta15$ is an inclination angle of first wiper edge portion 121 with respect to first straight portion 11. When viewed in the direction from first surface 1 toward second surface 2, first wiper edge portion 121 is inclined with respect to first straight portion 11 in the direction from first straight portion 11 toward second straight portion 12. In other words, first wiper edge portion 121 is inclined inward with respect to first straight portion 11. In the present specification, inward is the direction from outer peripheral side surface 3 toward inner circumferential surface 4. For example, first inclination angle $\theta15$ is greater than or equal to 2° and less than or equal to 10°. The lower limit of first inclination angle $\theta15$ is not particularly limited, but for example, may be greater than or equal to 3° or greater than or equal to 4°. The upper limit of first inclination angle $\theta15$ is not particularly limited, but may be less than or equal to 8° or less than or equal to 6°.

As illustrated in FIG. 7, a straight line passing through third connection point 153 and fourth connection point 154 is defined as a sixteenth virtual straight line 162. From another point of view, sixteenth virtual straight line 162 is a straight line passing through both ends of second wiper edge portion 122. The inclination angle of sixteenth virtual straight line 162 with respect to fifteenth virtual straight line 161 is defined as a second inclination angle $\theta16$. Second inclination angle $\theta16$ is an inclination angle of second wiper edge portion 122 with respect to first wiper edge portion 121. When viewed in the direction from first surface 1 toward second surface 2, second wiper edge portion 122 is inclined with respect to first wiper edge portion 121 in the direction from first wiper edge portion 121 toward second straight portion 12. In other words, second wiper edge portion 122 is inclined inward with respect to first wiper edge portion 121. For example, second inclination angle $\theta16$ is greater than or equal to 20° and less than or equal to 40°. The lower limit of second inclination angle $\theta16$ is not particularly limited, but for example, may be greater than or equal to 22.5° or greater than or equal to 25°. The upper limit of second inclination angle $\theta16$ is not particularly limited, but may be less than or equal to 37.5° or less than or equal to 35°.

Figure 8:
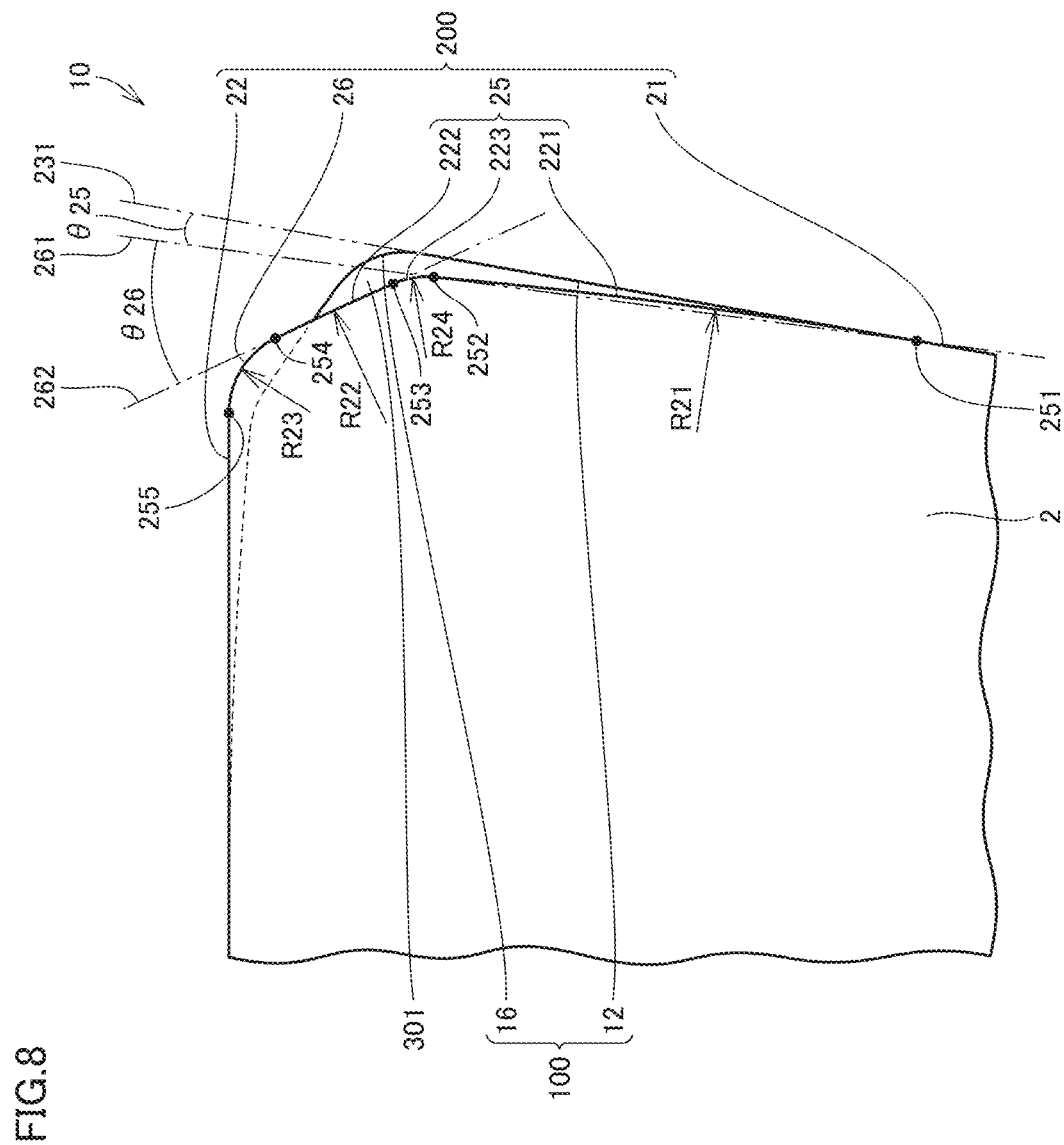
FIG. 8 is an enlarged schematic rear view illustrating a region VIII in FIG. 4 in an enlarged manner.

FIG. 8 is an enlarged schematic rear view illustrating a region VIII in FIG. 4 in an enlarged manner. As illustrated in FIG. 8, third wiper edge portion 221 is contiguous to third straight portion 21 at a sixth connection point 251. Second connection portion 223 is contiguous to third wiper edge portion 221 at a seventh connection point 252. Fourth wiper edge portion 222 is contiguous to second connection portion 223 at an eighth connection point 253. Second corner cutting edge 26 is contiguous to fourth wiper edge portion 222 at a ninth connection point 254. Fourth straight portion 22 is contiguous to second corner cutting edge 26 at a tenth connection point 255. When viewed in the direction from second surface 2 toward first surface 1, first ridgeline 100 is located outward of second ridgeline 200 at first corner cutting edge 16 of first ridgeline 100. Similarly, when viewed in the direction from first surface 1 toward second surface 2, first ridgeline 100 is located outward of second ridgeline 200 at first corner cutting edge 16. When viewed in the direction from first surface 1 toward second surface 2, first ridgeline 100 may be located outward of second ridgeline 200 at second straight portion 12.

When viewed in the direction from second surface 2 toward first surface 1, for example, each of third wiper edge portion 221, fourth wiper edge portion 222, second corner cutting edge 26, and second connection portion 223 has an arc shape. For example, each of third wiper edge portion 221, fourth wiper edge portion 222, second corner cutting edge 26, and second connection portion 223 has a shape protruding outward. The curvature radius of third wiper edge portion 221 is defined as a fifth curvature radius R21. The curvature radius of fourth wiper edge portion 222 is defined as a sixth curvature radius R22. The curvature radius of second corner cutting edge 26 is defined as a seventh curvature radius R23. The curvature radius of second connection portion 223 is defined as an eighth curvature radius R24.

When viewed in the direction from second surface 2 toward first surface 1, sixth curvature radius R22 is smaller than fifth curvature radius R21. A value obtained by dividing fifth curvature radius R21 by sixth curvature radius R22 is defined as R21/R22. For example, R21/R22 is greater than or equal to 1.1 and less than or equal to 4. The lower limit of R21/R22 is not particularly limited, but for example, may be greater than or equal to 1.3 or greater than or equal to 1.5. The upper limit of R21/R22 is not particularly limited, but for example, may be less than or equal to 3.5 or less than or equal to 3.

When viewed in the direction from second surface 2 toward first surface 1, seventh curvature radius R23 is smaller than sixth curvature radius R22. A value obtained by dividing sixth curvature radius R22 by seventh curvature radius R23 is defined as R22/R23. For example, R22/R23 is greater than or equal to 10 and less than or equal to 90. The lower limit of R22/R23 is not particularly limited, but for example, may be greater than or equal to 15 or greater than or equal to 20. The upper limit of R22/R23 is not particularly limited, but for example, may be less than or equal to 65 or less than or equal to 40.

When viewed in the direction from second surface 2 toward first surface 1, eighth curvature radius R24 is smaller than sixth curvature radius R22. A value obtained by dividing sixth curvature radius R22 by eighth curvature radius R24 is defined as R22/R24. For example, R22/R24 is greater than or equal to 10 and less than or equal to 90. The lower limit of R22/R24 is not particularly limited, but for example, may be greater than or equal to 15 or greater than or equal to 20. The upper limit of R22/R24 is not particularly limited, but for example, may be less than or equal to 65 or less than or equal to 40.

As illustrated in FIG. 8, a straight line passing through sixth connection point 251 and seventh connection point 252 is defined as a seventeenth virtual straight line 261. From another point of view, seventeenth virtual straight line 261 is a straight line passing through both ends of third wiper edge portion 221. The inclination angle of seventeenth virtual straight line 261 with respect to seventh virtual straight line 231 is defined as a third inclination angle θ25. In other words, third inclination angle θ25 is an inclination angle of seventeenth virtual straight line 261 with respect to third straight portion 21. Third inclination angle θ25 is an inclination angle of third straight portion 21 of third wiper edge portion 221. When viewed in the direction from second surface 2 toward first surface 1, third wiper edge portion 221 is inclined with respect to third straight portion 21 in the direction from third straight portion 21 toward fourth straight portion 22. In other words, third wiper edge portion 221 is inclined inward with respect to third straight portion 21. For example, third inclination angle θ25 is greater than or equal to 2° and less than or equal to 10°. The lower limit of third inclination angle θ25 is not particularly limited, but for example, may be greater than or equal to 3° or greater than or equal to 4°. The upper limit of third inclination angle θ25 is not particularly limited, but may be less than or equal to 8° or less than or equal to 6°.

As illustrated in FIG. 8, a straight line passing through eighth connection point 253 and ninth connection point 254 is defined as an eighteenth virtual straight line 262. From another point of view, eighteenth virtual straight line 262 is a straight line passing through both ends of fourth wiper edge portion 222. The inclination angle of eighteenth virtual straight line 262 with respect to seventeenth virtual straight line 261 is defined as a fourth inclination angle θ26. Fourth inclination angle 626 is an inclination angle with respect to fourth wiper edge portion 222 and third wiper edge portion 221. When viewed in the direction from second surface 2 toward first surface 1, fourth wiper edge portion 222 is inclined with respect to third wiper edge portion 221 in the direction from third wiper edge portion 221 toward fourth straight portion 22. In other words, fourth wiper edge portion 222 is inclined inward with respect to third wiper edge portion 221. For example, fourth inclination angle θ26 is greater than or equal to 20° and less than or equal to 40°. The lower limit of fourth inclination angle θ26 is not particularly limited, but for example, may be greater than or equal to 22.5° or greater than or equal to 25°. The upper limit of fourth inclination angle θ26 is not particularly limited, but may be less than or equal to 37.5° or less than or equal to 35°.

Second Embodiment

A configuration of a cutting insert according to a second embodiment of the present disclosure will be described below. The configuration of the cutting insert of the second embodiment is mainly different from the configuration of the cutting insert of the first embodiment in that a first breaker 77 and a second breaker 87 are provided, and is the same as the configuration of the cutting insert of the first embodiment in other points. Hereinafter, differences from the configuration of the cutting insert of the first embodiment will be mainly described.

Figure 9:
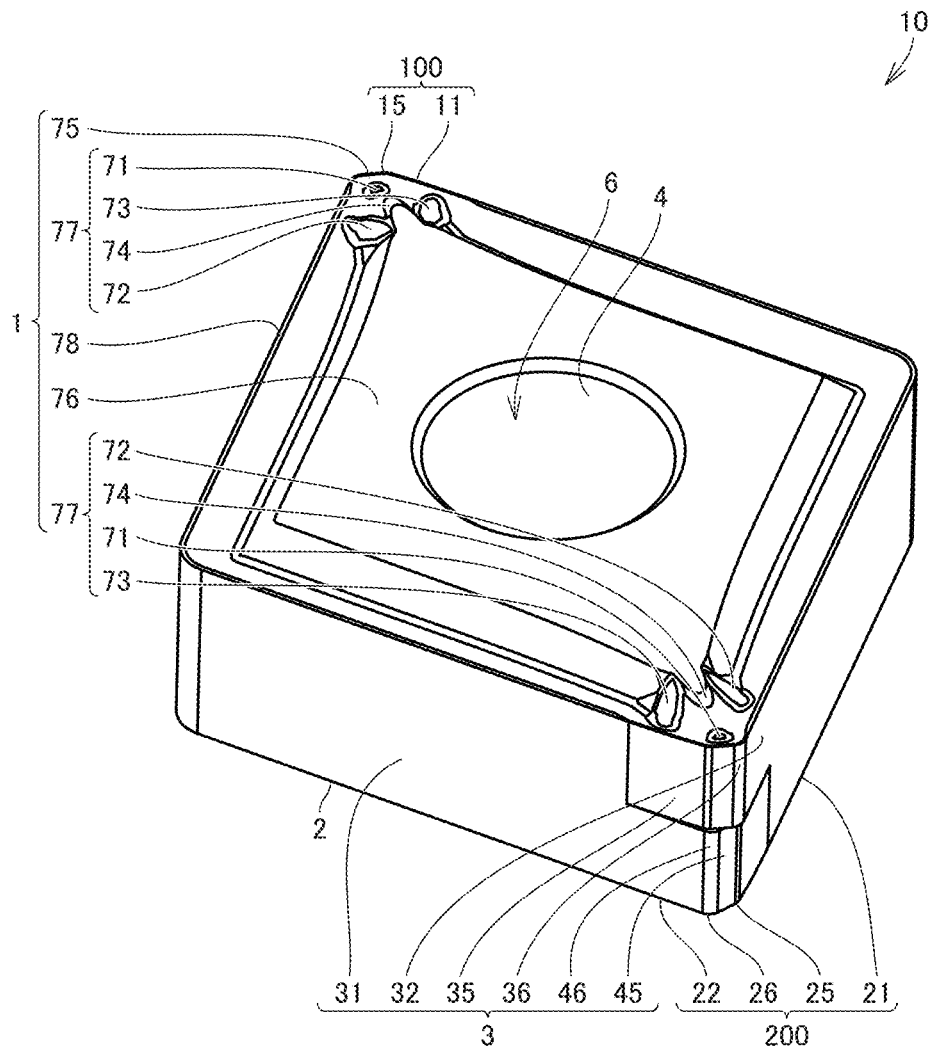
FIG. 9 is a schematic perspective view illustrating a configuration of a cutting insert according to a second embodiment.

FIG. 9 is a schematic perspective view illustrating the configuration of the cutting insert of the second embodiment. As illustrated in FIG. 9, first surface 1 includes a first rake surface 75, first breaker 77, a first seating surface 76, and a first land surface 78. First rake surface 75 is located between first ridgeline 100 and inner circumferential surface 4. For example, first breaker 77 is contiguous to first rake surface 75. For example, first seating surface 76 has a planar shape. For example, first seating surface 76 is contiguous to inner circumferential surface 4. First seating surface 76 is located between first breaker 77 and inner circumferential surface 4. For example, first land surface 78 has an annular shape. For example, first land surface 78 is contiguous to each of first ridgeline 100 and first rake surface 75.

First breaker 77 includes a first inclined surface 74, a first protrusion 71, a second protrusion 72, and a third protrusion 73. For example, first inclined surface 74 is contiguous to first seating surface 76. First inclined surface 74 is located between first rake surface 75 and first seating surface 76. For example, first protrusion 71 is located between first rake surface 75 and first inclined surface 74. For example, each of second protrusion 72 and third protrusion 73 may be contiguous to first inclined surface 74. First inclined surface 74 is located between second protrusion 72 and third protrusion 73.

Figure 10:
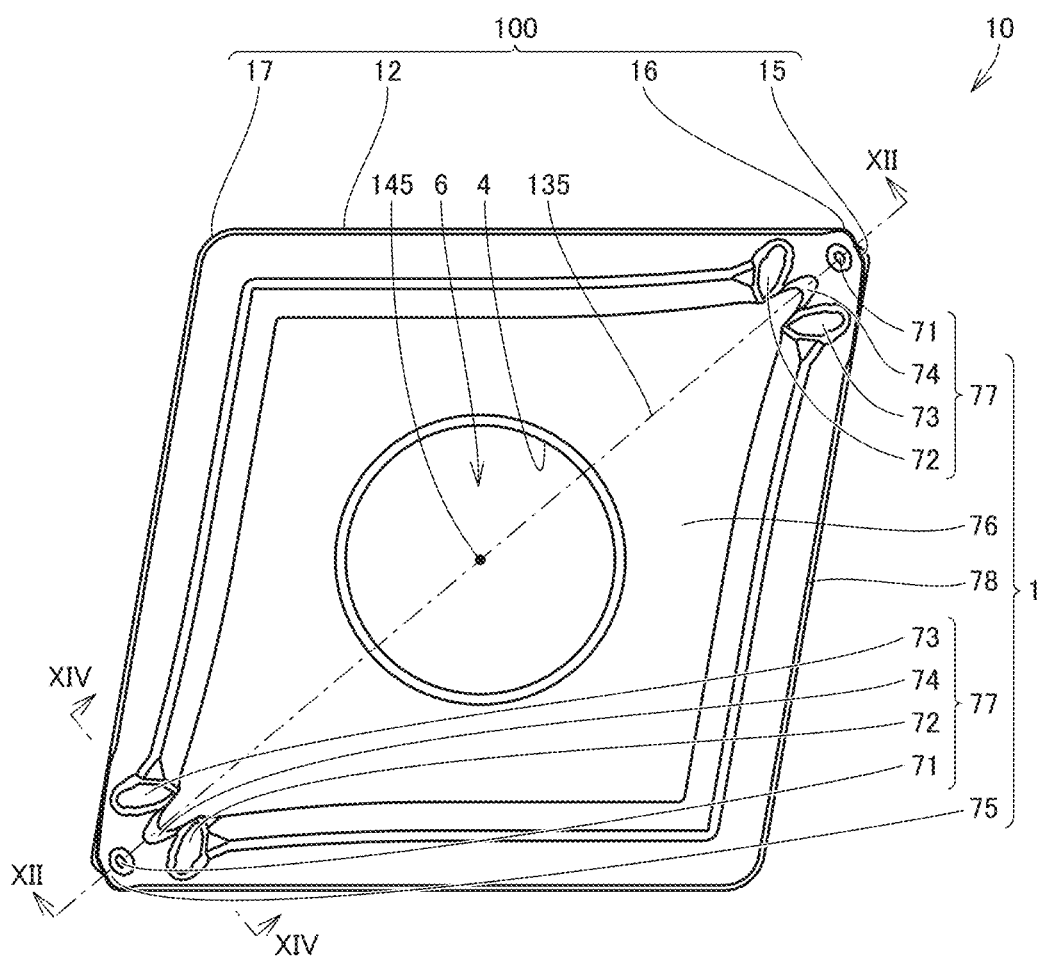
FIG. 10 is a schematic front view illustrating the configuration of the cutting insert of the second embodiment.

FIG. 10 is a schematic front view illustrating the configuration of cutting insert 10 of the second embodiment. The schematic view in FIG. 10 is a schematic front view when viewed in the direction from first surface 1 toward second surface 2 of cutting insert 10. As illustrated in FIG. 10, when viewed in the direction from first surface 1 toward second surface 2, for example, each of first inclined surface 74 and first protrusion 71 is positioned so as to pass through fifth virtual straight line 135 of cutting insert 10. For example, fifth virtual straight line 135 is located between second protrusion 72 and third protrusion 73. First surface 1 is substantially two-fold symmetric about rotation center 145.

Figure 11:
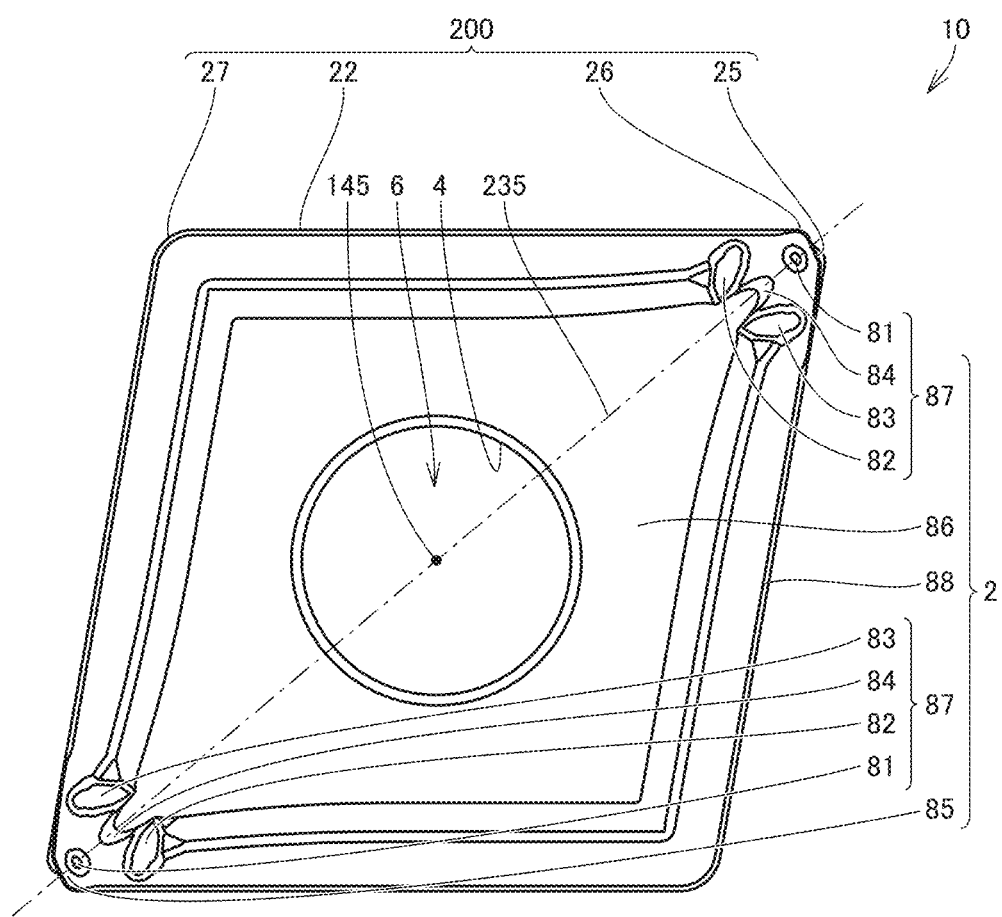
FIG. 11 is a schematic rear view illustrating the configuration of the cutting insert of the second embodiment.

FIG. 11 is a schematic rear view illustrating the configuration of cutting insert 10 of the second embodiment. The schematic view in FIG. 11 is a schematic rear view of cutting insert 10 when viewed in the direction from second surface 2 toward first surface 1. As illustrated in FIG. 11, second surface 2 includes a second rake surface 85, second breaker 87, a second seating surface 86, and a second land surface 88. Second rake surface 85 is located between second ridgeline 200 and inner circumferential surface 4. For example, second breaker 87 is contiguous to second rake surface 85. For example, second seating surface 86 has a planar shape. For example, second seating surface 86 is contiguous to inner circumferential surface 4. Second seating surface 86 is located between second breaker 87 and inner circumferential surface 4. For example, second land surface 88 has an annular shape. For example, second land surface 88 is contiguous to each of second ridgeline 200 and second rake surface 85.

Second breaker 87 includes a second inclined surface 84, a fourth protrusion 81, a fifth protrusion 82, and a sixth protrusion 83. For example, second inclined surface 84 is contiguous to second seating surface 86. Second inclined surface 84 is located between second rake surface 85 and second seating surface 86. For example, fourth protrusion 81 is located between second rake surface 85 and second inclined surface 84. For example, each of fifth protrusion 82 and sixth protrusion 83 may be contiguous to second inclined surface 84. Second inclined surface 84 is located between fifth protrusion 82 and sixth protrusion 83.

When viewed in the direction from second surface 2 toward first surface 1, for example, each of the second inclined surface 84 and fourth protrusion 81 is located so as to pass through eleventh virtual straight line 235 of cutting insert 10. For example, eleventh virtual straight line 235 is located between fifth protrusion 82 and sixth protrusion 83. Second surface 2 is substantially two-fold symmetric about rotation center 145.

Figure 12:
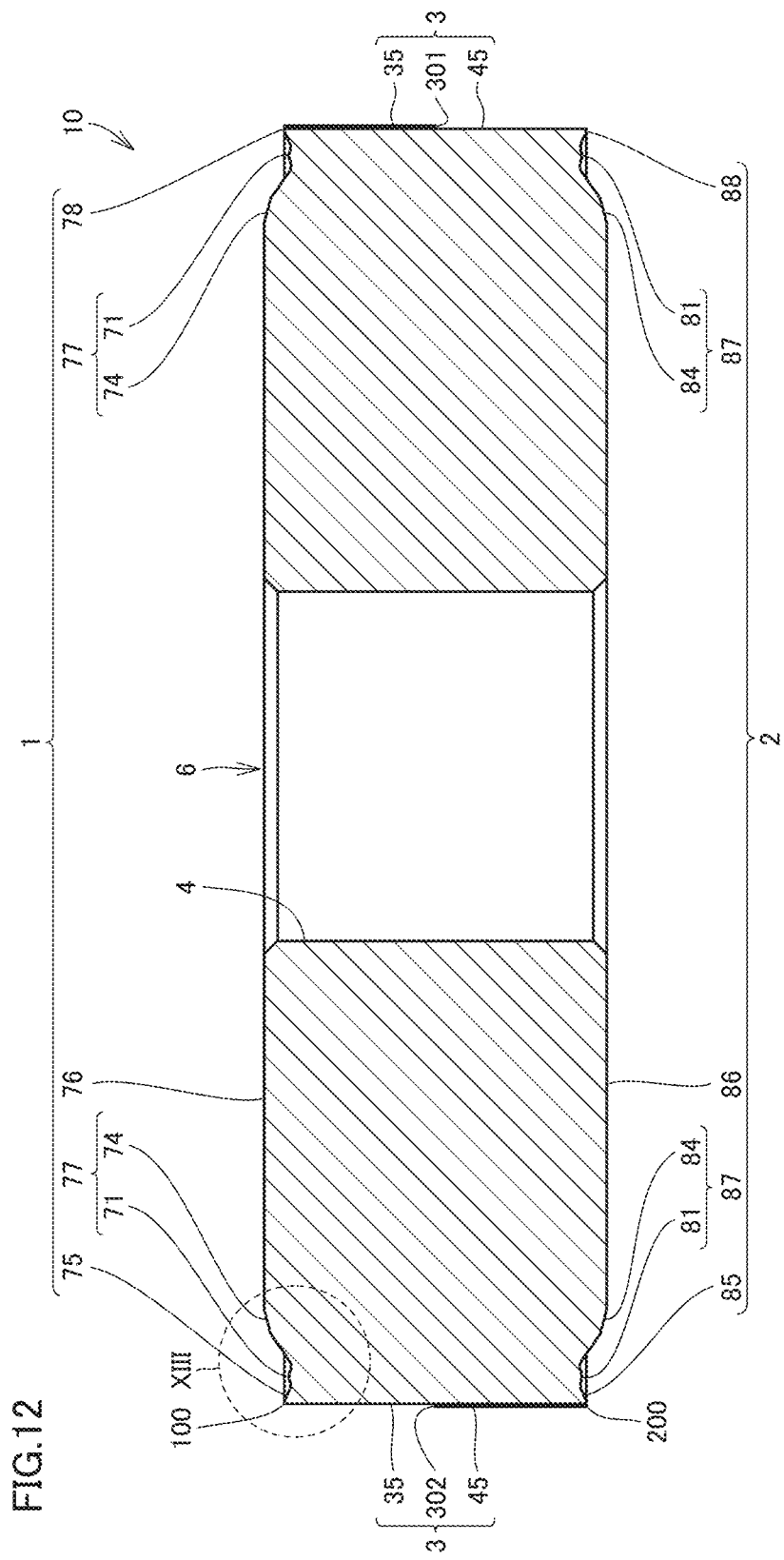
FIG. 12 is a schematic longitudinal sectional view taken along a line XII-XII in FIG. 10.

FIG. 12 is a schematic longitudinal sectional view taken along a line XII-XII in FIG. 10. The section in FIG. 12 is perpendicular to first surface 1 and includes fifth virtual straight line 135. As illustrated in FIG. 12, second seating surface 86 is substantially parallel to first seating surface 76. First protrusion 71 has a shape protruding upward. In the present specification, upward is the direction from second surface 2 toward first surface 1. Fourth protrusion 81 has a shape protruding downward. In the present specification, downward is the direction from first surface 1 toward second surface 2. In the direction from first surface 1 toward second surface 2, first ridgeline 100 is located downward of first seating surface 76. In other words, in the direction from first surface 1 toward second surface 2, first ridgeline 100 is located between first seating surface 76 and second ridgeline 200. Similarly, second ridgeline 200 is located upward of second seating surface 86 in the direction from first surface 1 toward second surface 2. In other words, in the direction from first surface 1 toward second surface 2, second ridgeline 200 is located between second seating surface 86 and first ridgeline 100.

Figure 13:
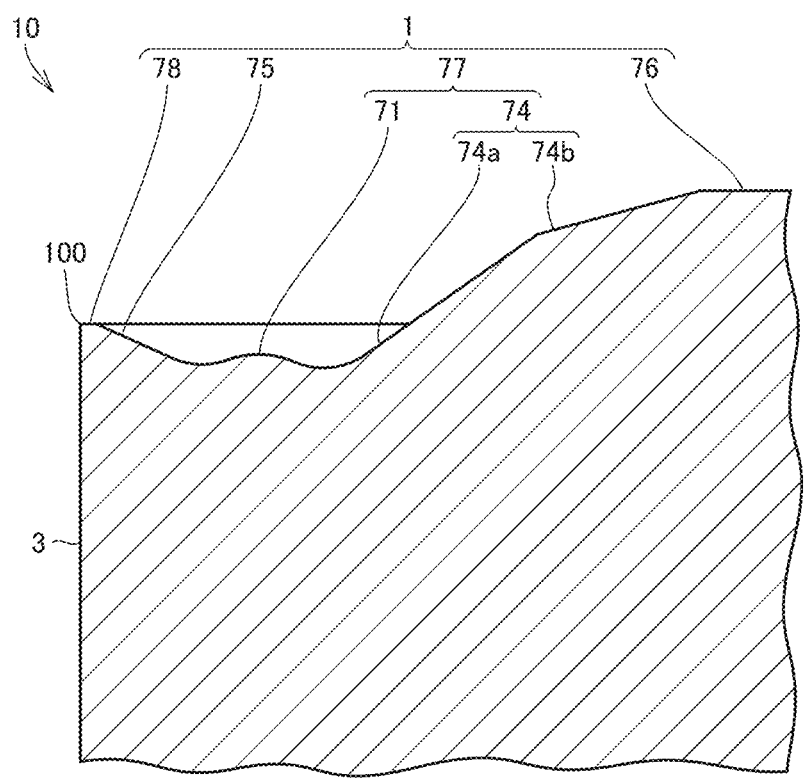
FIG. 13 is an enlarged longitudinal sectional schematic view illustrating a region XIII in FIG. 12 in an enlarged manner.

FIG. 13 is an enlarged longitudinal sectional schematic view illustrating a region XIII in FIG. 12 in an enlarged manner. As illustrated in FIG. 13, in the sectional view, first land surface 78 is inclined with respect to outer peripheral side surface 3. For example, the inclination angle of first land surface 78 with respect to outer peripheral side surface 3 is 90°. In the sectional view, for example, first rake surface 75 is inclined downward with respect to first land surface 78. For example, first protrusion 71 is contiguous to each of first rake surface 75 and first inclined surface 74.

As illustrated in FIG. 13, in the sectional view, first protrusion 71 is located downward of first land surface 78. From another point of view, in the direction from first surface 1 toward second surface 2, first protrusion 71 is located between first land surface 78 and second land surface 88. First inclined surface 74 is inclined such that the height in the direction from second surface 2 toward first surface 1 increases as the distance from first protrusion 71 increases. First inclined surface 74 includes a first inclined portion 74*a* and a second inclined portion 74*b* contiguous to first inclined portion 74*a*. In the sectional view, first inclined portion 74*a* is located downward of first land surface 78. In other words, in the direction from first surface 1 toward second surface 2, first inclined portion 74*a* is located between first land surface 78 and second land surface 88. In the sectional view, second inclined portion 74*b* is located upward of first land surface 78. In other words, in the direction from first surface 1 toward second surface 2, second inclined portion 74*b* is located between first land surface 78 and first seating surface 76.

Figure 14:
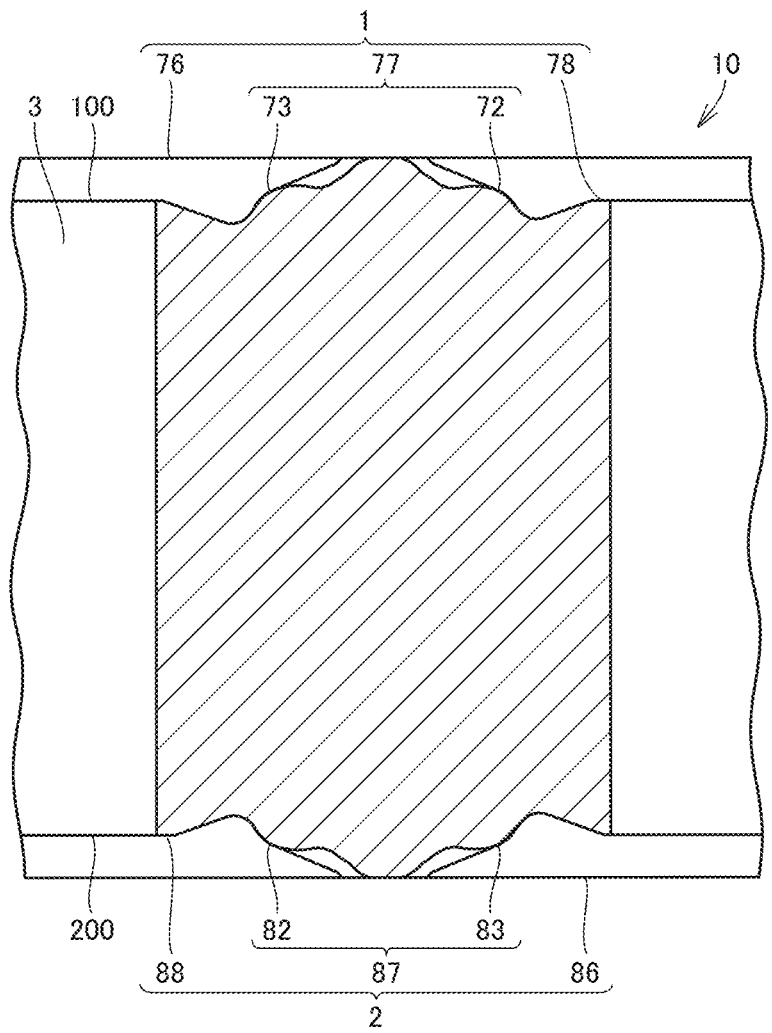
FIG. 14 is a schematic longitudinal sectional view taken along a line XIV-XIV in FIG. 10.

FIG. 14 is a schematic longitudinal sectional view taken along a line XIV-XIV in FIG. 10. The section in FIG. 14 is perpendicular to first surface 1 and intersects with each of second protrusion 72 and third protrusion 73. As illustrated in FIG. 14, each of second protrusion 72 and third protrusion 73 has a convex shape in the direction toward first seating surface 76. Each of fifth protrusion 82 and sixth protrusion 83 has a shape protruding in the direction toward second seating surface 86.

In the direction from first surface 1 toward second surface 2, for example, the most protruding portion of second protrusion 72 is located between first seating surface 76 and first land surface 78. In the direction from first surface 1 toward second surface 2, for example, the most protruding portion of third protrusion 73 is located between first seating surface 76 and first land surface 78.

In the direction from first surface 1 toward second surface 2, for example, the most protruding portion of fifth protrusion 82 is located between second seating surface 86 and second land surface 88. In the direction from first surface 1 toward second surface 2, for example, the most protruding portion of sixth protrusion 83 is located between second seating surface 86 and second land surface 88.

Third Embodiment

A configuration of a cutting insert according to a third embodiment of the present disclosure will be described below. The configuration of the cutting insert of the third embodiment is mainly different from the configuration of the cutting insert of the second embodiment in that each of first surface 1 and second surface 2 is substantially hexagonal as viewed in the direction from first surface 1 toward second surface 2, and is the same as the configuration of the cutting insert of the second embodiment in other points. Hereinafter, differences from the configuration of the cutting insert of the second embodiment will be mainly described.

Figure 15:
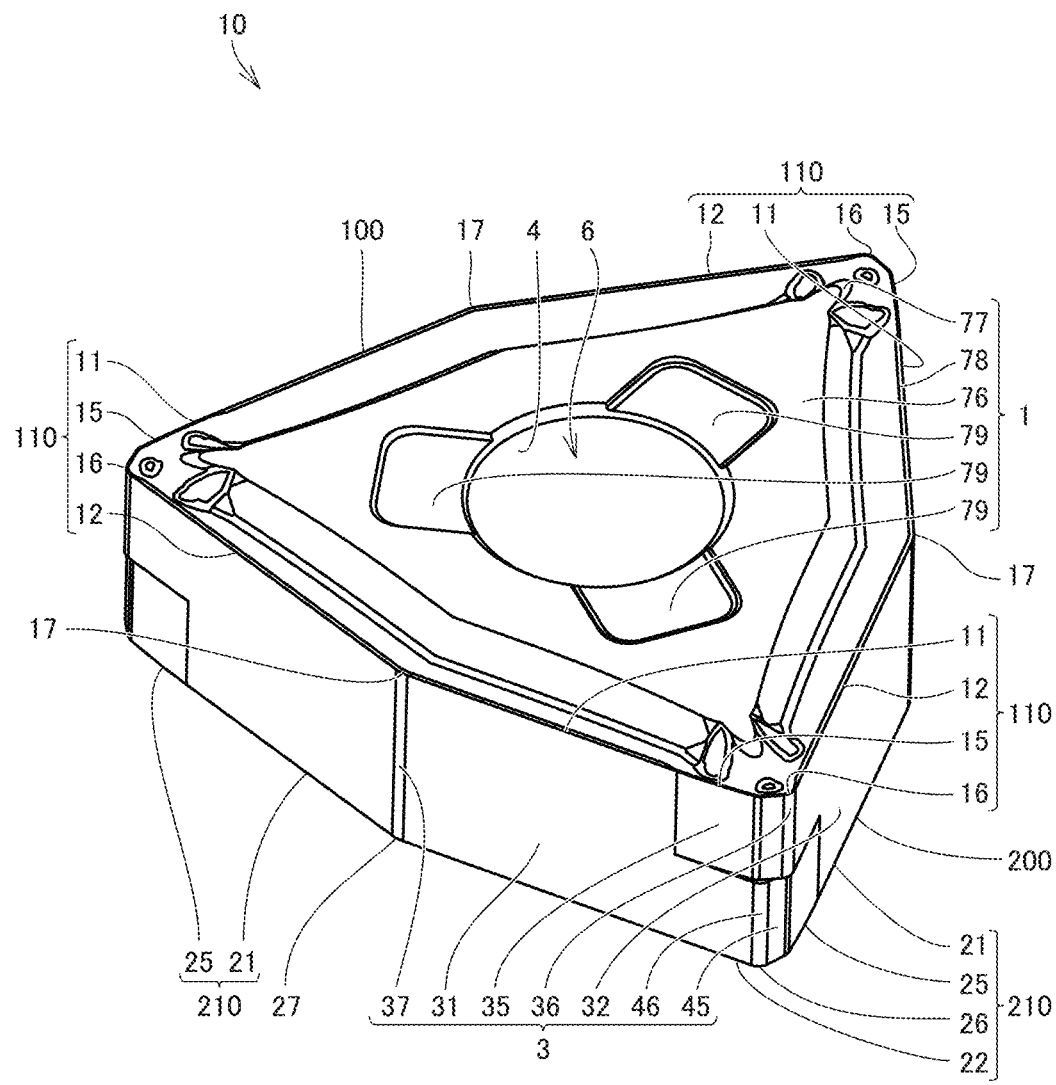
FIG. 15 is a schematic perspective view illustrating a configuration of a cutting insert according to a third embodiment.

FIG. 15 is a schematic perspective view illustrating the configuration of the cutting insert of the third embodiment. As illustrated in FIG. 15, first ridgeline 100 includes three first portions 110 and three first corner portions 17. Each of three first portions 110 includes first straight portion 11, first wiper edge 15, first corner cutting edge 16, and second straight portion 12. First ridgeline 100 includes three first straight portions 11, three second straight portions 12, three first wiper edges 15, and three first corner cutting edges 16. In first ridgeline 100, first straight portion 11 and second straight portion 12 are alternately positioned in the circumferential direction. A boundary between two adjacent first portions 110 forms first corner portion 17. First corner portion 17 is positioned between first straight portion 11 in one of two adjacent first portions 110 and second straight portion 12 in the other of two adjacent first portions 110.

Second ridgeline 200 mainly includes a second portion 210 and second corner portion 27. Second portion 210 includes third straight portion 21, second wiper edge 25, second corner cutting edge 26, and fourth straight portion 22. Fourth straight portion 22 is contiguous to second corner portion 27.

First surface 1 may have a first recess 79. In the direction from inner circumferential surface 4 toward outer peripheral side surface 3, for example, first recess 79 is located between inner circumferential surface 4 and first ridgeline 100. First recess 79 may be contiguous to inner circumferential surface 4. For example, first recess 79 is separated from first ridgeline 100. First recess 79 may be contiguous to first seating surface 76.

Figure 16:
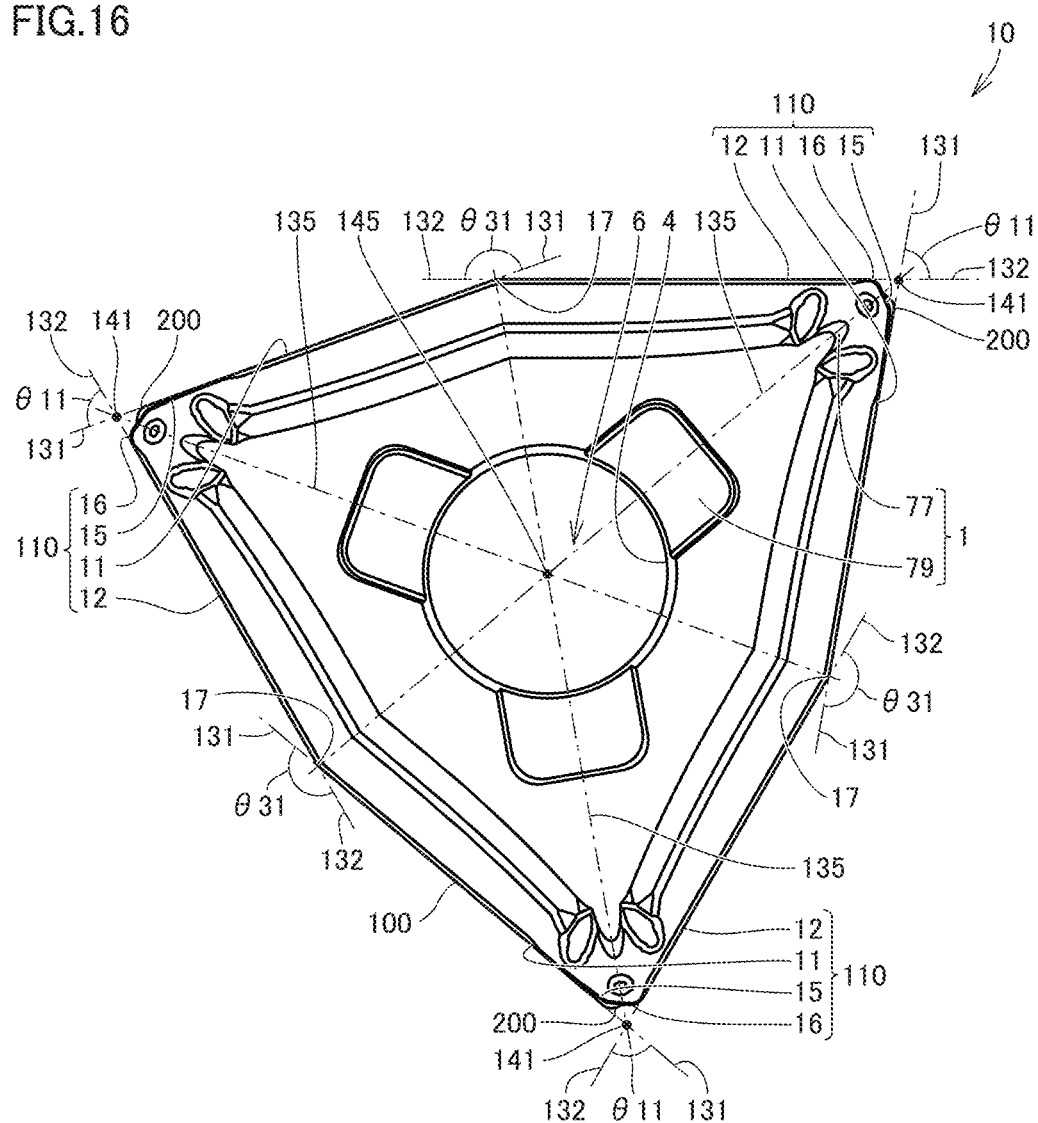
FIG. 16 is a schematic front view illustrating the configuration of the cutting insert of the third embodiment.

FIG. 16 is a schematic front view illustrating the configuration of cutting insert 10 of the third embodiment. The schematic front view in FIG. 16 is a schematic front view when viewed in the direction from first surface 1 toward second surface 2 of cutting insert 10. As illustrated in FIG. 16, first ridgeline 100 has a substantially hexagonal shape when viewed in the direction from first surface 1 toward second surface 2.

In each of three first portions 110, the bisector of the angle formed by first virtual straight line 131 and second virtual straight line 132 is defined as fifth virtual straight line 135. The angle formed by first virtual straight line 131 and second virtual straight line 132 between two adjacent first portions 110 may be bisected by fifth virtual straight line 135 of first portion 110 other than two first portions 110. When viewed in the direction from first surface 1 toward second surface 2, the outline formed by first ridgeline 100 and second ridgeline 200 that overlap each other is line-symmetric with respect to fifth virtual straight line 135.

A point at which three fifth virtual straight lines 135 intersect with each other is defined as rotation center 145. Rotation center 145 is located on fifth virtual straight line 135. In other words, fifth virtual straight line 135 passes through rotation center 145. When viewed in the direction from first surface 1 toward second surface 2, rotation center 145 may be located at the center of inner circumferential surface 4. When viewed in the direction from first surface 1 toward second surface 2, the shape of first surface 1 is three-fold symmetric about rotation center 145. From another point of view, when viewed in the direction from first surface 1 toward second surface 2, the shape obtained by rotating the outer shape of first surface 1 by 1200 around rotation center 145 is matched with the outer shape of first surface 1.

On first ridgeline 100, three first straight portions 11, three first wiper edges 15, three first corner cutting edges 16, three second straight portions 12, and three first corner portions 17 are provided so as to be three-fold symmetric about rotation center 145. On first surface 1, three first breakers 77 may be provided so as to be three-fold symmetric about rotation center 145. Similarly, on first surface 1, three first recesses 79 may be provided so as to be three-fold symmetric about rotation center 145.

When viewed in the direction from first surface 1 toward second surface 2, the angle formed by first virtual straight line 131 and second virtual straight line 132 in first portion 110 is defined as first angle $\theta 11$. For example, first angle $\theta 11$ is greater than or equal to 75° and less than or equal to 85°. The lower limit of first angle $\theta 11$ is not particularly limited, but for example, may be greater than or equal to 77° or greater than or equal to 79°. The upper limit of first angle $\theta 11$ is not particularly limited, but for example, may be less than or equal to 83° or less than or equal to 81°.

When viewed in the direction from first surface 1 toward second surface 2, the angle formed by first virtual straight line 131 and second virtual straight line 132 between two adjacent first portions 110 is defined as a tenth angle $\theta 31$. For example, tenth angle $\theta 31$ is greater than or equal to 155° and less than or equal to 165°. The lower limit of tenth angle $\theta 31$ is not particularly limited, but for example, may be greater than or equal to 157° or greater than or equal to 159°. The upper limit of tenth angle $\theta 31$ is not particularly limited, but for example, may be less than or equal to 163° or less than or equal to 161°. Tenth angle $\theta 31$ may be larger than first angle $\theta 11$.

Figure 17:
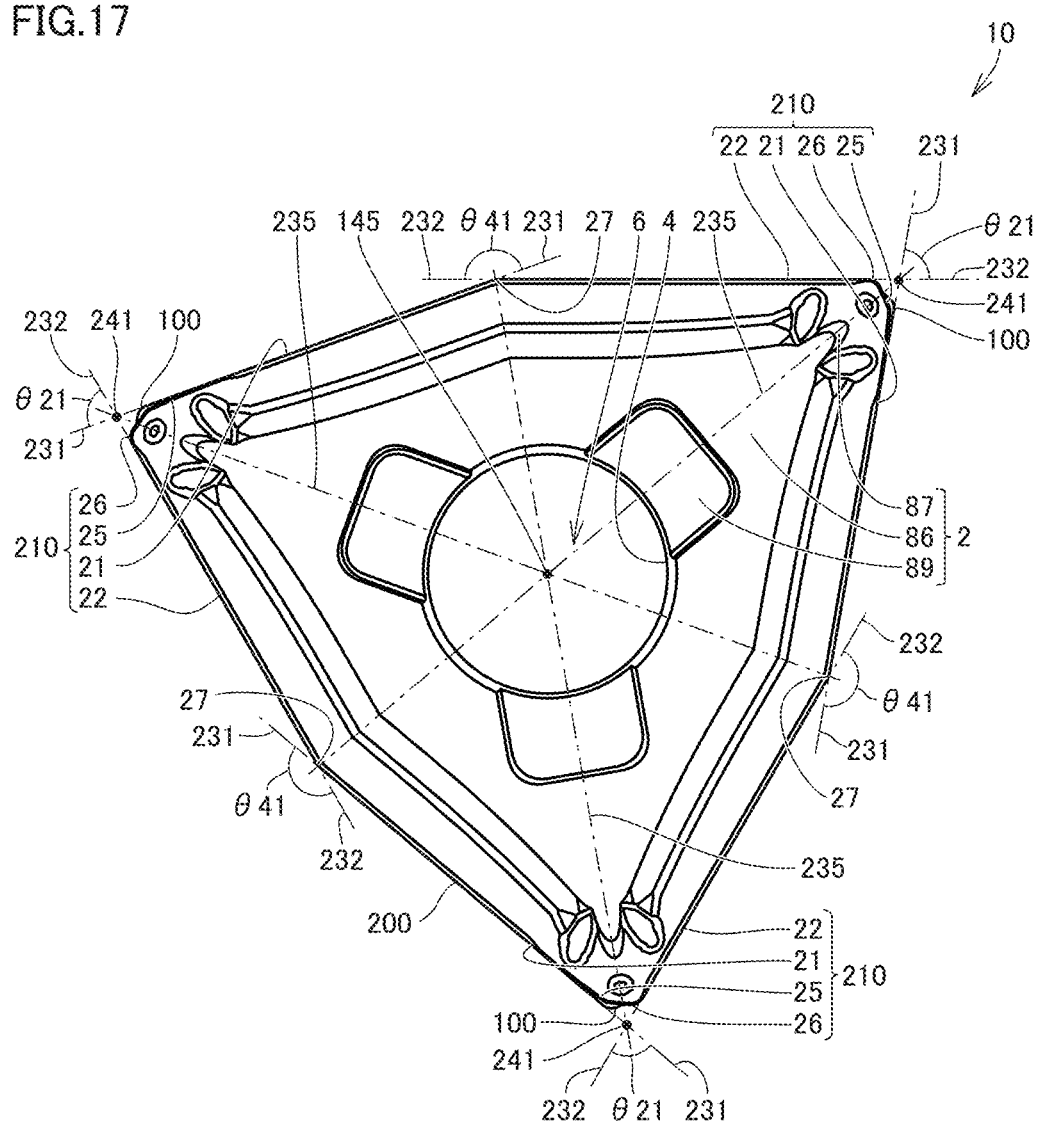
FIG. 17 is a schematic rear view illustrating the configuration of the cutting insert of the third embodiment.

FIG. 17 is a schematic rear view illustrating the configuration of cutting insert 10 of the third embodiment. The schematic rear view in FIG. 17 is a schematic rear view of cutting insert 10 when viewed in the direction from second surface 2 toward first surface 1.

As illustrated in FIG. 17, second ridgeline 200 has a substantially hexagonal shape when viewed in the direction from second surface 2 toward first surface 1. Second ridgeline 200 includes three second portions 210 and three second corner portions 27. Second ridgeline 200 includes three third straight portions 21, three fourth straight portions 22, three second wiper edges 25, and three second corner cutting edges 26. In second ridgeline 200, third straight portion 21 and fourth straight portion 22 are alternately positioned in the circumferential direction. A boundary between two adjacent second portions 210 forms second corner portion 27. Second corner portion 27 is positioned between third straight portion 21 in one of two adjacent second portions 210 and fourth straight portion 22 in the other of two adjacent second portions 210.

Second surface 2 may have a second recess 89. When viewed in the direction from second surface 2 toward first surface 1, for example, second recess 89 is located between inner circumferential surface 4 and second ridgeline 200. Second recess 89 may be contiguous to inner circumferential surface 4. For example, second recess 89 is separated from second ridgeline 200. Second recess 89 may be contiguous to second seating surface 86.

In each of three second portions 210, the bisector of the angle formed by seventh virtual straight line 231 and eighth virtual straight line 232 is defined as eleventh virtual straight line 235. The angle formed by seventh virtual straight line 231 and eighth virtual straight line 232 between two adjacent second portions 210 may be bisected by eleventh virtual straight line 235 of second portion 210 other than two second portions 210. When viewed in the direction from second surface 2 toward first surface 1, the outline formed by first ridgeline 100 and second ridgeline 200 that overlap each other is line-symmetric with respect to eleventh virtual straight line 235.

When viewed in the direction from second surface 2 toward first surface 1, rotation center 145 is located at a point where three eleventh virtual straight lines 235 intersect. When viewed in the direction from second surface 2 toward first surface 1, rotation center 145 is located on eleventh virtual straight line 235. When viewed in the direction from second surface 2 toward first surface 1, the shape of second surface 2 is three-fold symmetric about rotation center 145. Similarly, when viewed in the direction from first surface 1 toward second surface 2, the shape of second surface 2 is three-fold symmetric about rotation center 145. From another point of view, the shape obtained by rotating the outer shape of second surface 2 by 120° around rotation center 145 is matched with the outer shape of second surface 2.

On second ridgeline 200, three third straight portions 21, three second wiper edges 25, three second corner cutting edges 26, three fourth straight portions 22, and three second corner portions 27 are provided so as to be three-fold symmetric about rotation center 145. On second surface 2, three second breakers 87 may be provided so as to be three-fold symmetric about rotation center 145. Similarly, on second surface 2, three second recesses 89 may be provided so as to be three-fold symmetric about rotation center 145.

When viewed from second surface 2 toward first surface 1, the angle formed by seventh virtual straight line 231 and eighth virtual straight line 232 in second portion 210 is defined as fifth angle $\theta 21$. For example, fifth angle $\theta 21$ is 80°. For example, fifth angle $\theta 21$ may be greater than or equal to 75° and less than or equal to 85°. The lower limit of fifth angle $\theta 21$ is not particularly limited, but for example, may be greater than or equal to 77° or greater than or equal to 79°. The upper limit of fifth angle θ21 is not particularly limited, but for example, may be less than or equal to 83° or less than or equal to 81°.

When viewed in the direction from second surface 2 toward first surface 1, the angle formed by seventh virtual straight line 231 and eighth virtual straight line 232 between two adjacent second portions 210 is defined as an eleventh angle θ41. For example, eleventh angle θ41 is greater than or equal to 155° and less than or equal to 165°. The lower limit of eleventh angle θ41 is not particularly limited, but for example, may be greater than or equal to 157° or greater than or equal to 159°. The upper limit of eleventh angle θ41 is not particularly limited, but for example, may be less than or equal to 163° or less than or equal to 161°. Eleventh angle θ41 may be larger than fifth angle θ21.

Functions and effects of cutting insert 10 according to the above embodiment will be described below.

According to cutting insert 10 of the embodiment, outer peripheral side surface 3 includes first plane 301 contiguous to each of first corner flank surface 36 and second wiper flank surface 45 and second plane 302 contiguous to second corner flank surface 46 and first wiper flank surface 35. As illustrated in FIGS. 5 and 6, each of first plane 301 and second plane 302 extends along the direction perpendicular to the direction from first surface 1 toward second surface 2 of cutting insert 10. Therefore, in the manufacturing process of cutting insert 10, for example, first ridgeline 100, second ridgeline 200, and outer peripheral side surface 3 can be formed using the grinding.

Specifically, for example, each of first wiper flank surface 35 and first corner flank surface 36 is formed by performing the first grinding on outer peripheral side surface 3 on which first side surface 31 and second side surface 32 are formed. At this time, first ridgeline 100 and second plane 302 are simultaneously formed. Thereafter, each of second wiper flank surface 45 and second corner flank surface 46 is formed by performing the second grinding. At this time, second ridgeline 200 and first plane 301 are simultaneously formed. As described above, first ridgeline 100, second ridgeline 200, and outer peripheral side surface 3 are formed. Therefore, for example, cutting insert 10 can be manufactured without using a multi-axis press. Accordingly, a die for multi-axis pressing becomes unnecessary. This facilitates the manufacture of cutting insert 10.

Figure 18:
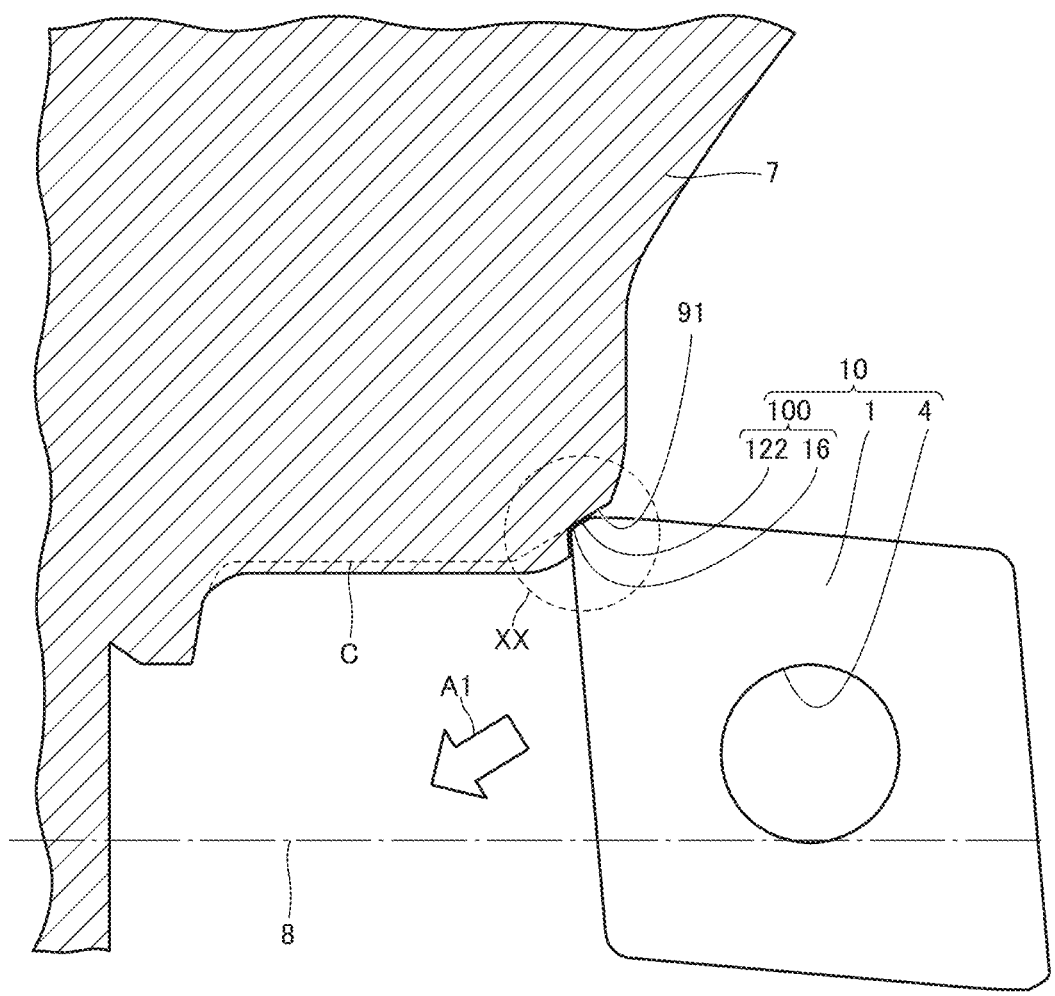
FIG. 18 is a schematic view illustrating a state in which a tapered surface of a workpiece is turned using the cutting insert.

FIG. 18 is a schematic view illustrating a state in which a tapered surface of a workpiece is turned using cutting insert 10. In FIG. 18, a curve C indicated by a broken line indicates the outer shape of a workpiece 7 after machining. Workpiece 7 rotates about a rotation axis 8. A tapered surface 91 of workpiece 7 is inclined with respect to rotation axis 8. For example, cutting insert 10 is attached to a tool body (not illustrated). For example, cutting insert 10 cuts workpiece 7 by coming into contact with rotating workpiece 7 at first ridgeline 100. At the same time, for example, cutting insert 10 is fed in the direction of an arrow A1. The direction of arrow A1 is the direction along the extending direction of tapered surface 91 of workpiece 7.

As illustrated in FIG. 18, when tapered surface 91 of workpiece 7 is cut, cutting insert 10 cuts workpiece 7 using first corner cutting edge 16. At this time, second wiper edge portion 122 comes into contact with tapered surface 91. Thus, it is possible to perform finish processing can be performed on tapered surface 91 at the same time as cutting workpiece 7.

Figure 19:
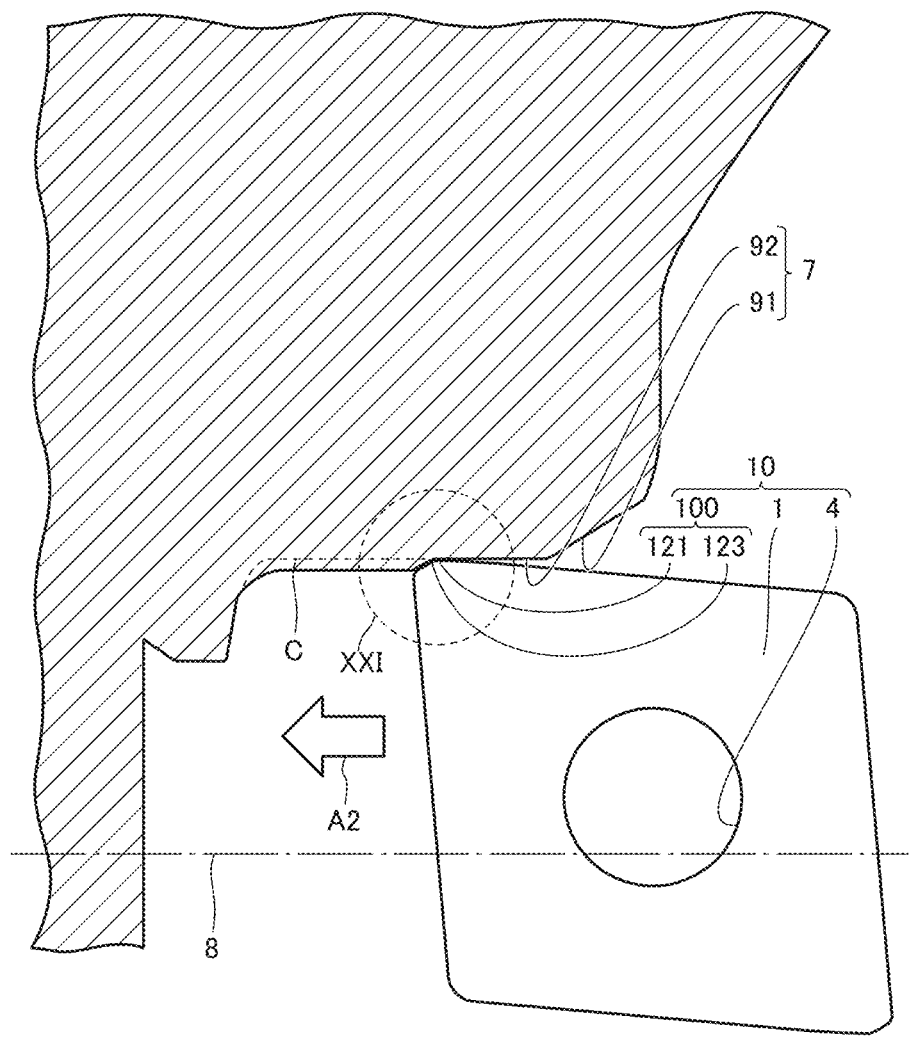
FIG. 19 is a schematic view illustrating a state in which a parallel surface of the workpiece is turned using the cutting insert.

FIG. 19 is a schematic view illustrating a state in which a parallel surface of workpiece 7 is turned using cutting insert 10. As illustrated in FIG. 19, cutting insert 10 cuts parallel surface 92 of workpiece 7. Parallel surface 92 extends along the direction parallel to rotation axis 8. Cutting insert 10 is fed in the direction of an arrow A2 of workpiece 7. Arrow A2 is the direction along the direction parallel to rotation axis 8.

As illustrated in FIG. 19, when parallel surface 92 of workpiece 7 is cut, cutting insert 10 cuts workpiece 7 using first connection portion 123. At this time, first wiper edge portion 121 comes into contact with parallel surface 92. As a result, parallel surface 92 can be finished at the same time as cutting workpiece 7.

According to cutting insert 10 of the above embodiment, first wiper edge portion 121 is inclined with respect to first straight portion 11. Second wiper edge portion 122 is inclined with respect to first wiper edge portion 121. Therefore, as illustrated in FIGS. 18 and 19, cutting insert 10 can perform finish machining on each of tapered surface 91 and parallel surface 92 of workpiece 7 at the same time as cutting workpiece 7 on each of tapered surface 91 of workpiece 7 inclined with respect to rotation axis 8 and parallel surface 92 of workpiece 7 parallel to rotation axis 8. Thus, tapered surface 91 and parallel surface 92 can be processed by one tool. Accordingly, processing efficiency of the workpiece having the tapered surface and the parallel surface is improved.

In the case of turning the tapered surface, the feed direction of cutting insert 10 of the above embodiment is not limited to the direction of arrow A1. For example, cutting insert 10 may be fed in a counter direction of arrow A1. Even in this case, the finish processing of the tapered surface can be performed similarly to the case where the feeding direction is the direction of arrow A1.

Figure 20:
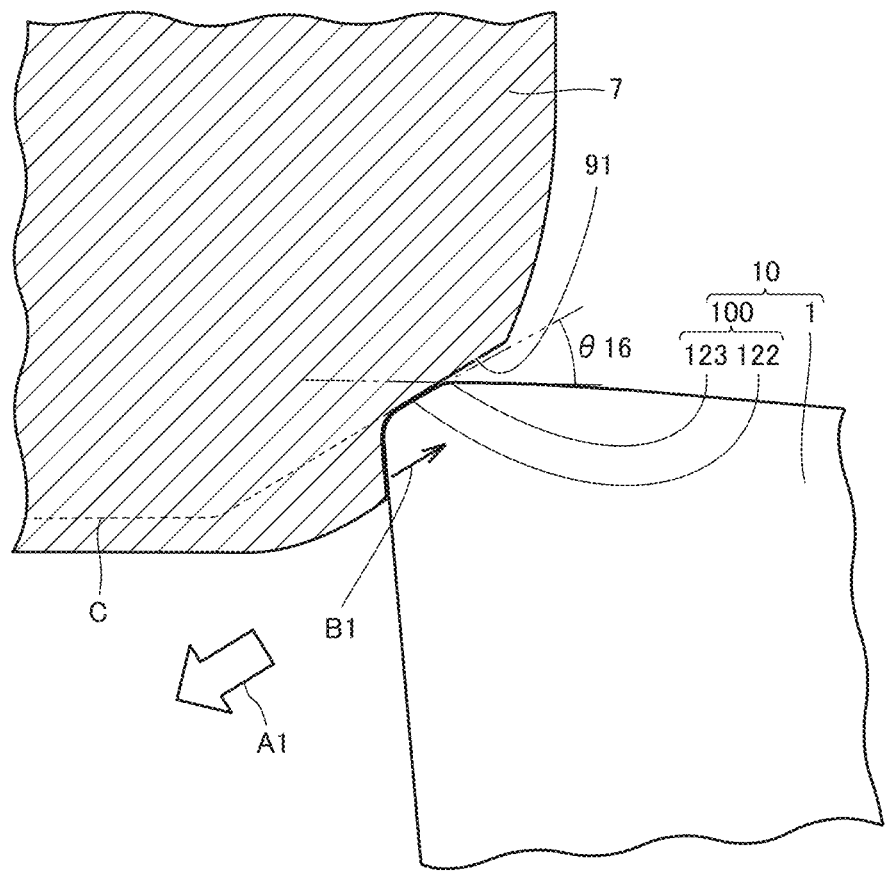
FIG. 20 is an enlarged schematic view of a region XX in FIG. 18.

FIG. 20 is an enlarged schematic view of a region XX in FIG. 18. As illustrated in FIG. 20, second wiper edge portion 122 is disposed along tapered surface 91 of workpiece 7. The direction of arrow A1 that is the feeding direction is the direction along the extending direction of tapered surface 91. In other words, the direction of arrow A1 is the direction along the extending direction of second wiper edge portion 122. Accordingly, when second inclination angle θ16 increases, the direction of arrow A1 becomes closer to the direction perpendicular to rotation axis 8. Cutting insert 10 is loaded with feed component force in the counter direction of arrow A1 that is the feed direction. The direction of the feed component force is the direction of an arrow B1. Therefore, when second inclination angle θ16 increases, the direction of the feed component force applied to cutting insert 10 becomes closer to the direction perpendicular to rotation axis 8. In other words, in the force applied to cutting insert 10, the component in the direction perpendicular to rotation axis 8 increases. Thus, vibration of cutting insert 10 increases during machining. That is, when second inclination angle θ16 is excessively increased, the vibration of cutting insert 10 increases.

According to cutting insert 10 of the above embodiment, second inclination angle θ16 between second wiper edge portion 122 and first wiper edge portion 121 is preferably less than or equal to 40°. For this reason, second inclination angle θ16 can be prevented from becoming excessively large. Thus, the vibration of cutting insert 10 can be prevented during machining.

As illustrated in FIG. 20, when second curvature radius R12 of second wiper edge portion 122 is excessively large, second wiper edge portion 122 is separated from tapered surface 91 when the attachment angle of cutting insert 10 deviates from the target angle. Accordingly, the finish processing cannot be performed on tapered surface 91. For this reason, surface roughness of the tapered surface of workpiece 7 is degraded. According to cutting insert 10 of the above embodiment, second curvature radius R12 of second wiper edge portion 122 is smaller than first curvature radius R11 of first wiper edge portion 121. Accordingly, second curvature radius R12 can be prevented from becoming excessively large. For this reason, the degradation of the surface roughness of the tapered surface of workpiece 7 can be prevented.

Figure 21:
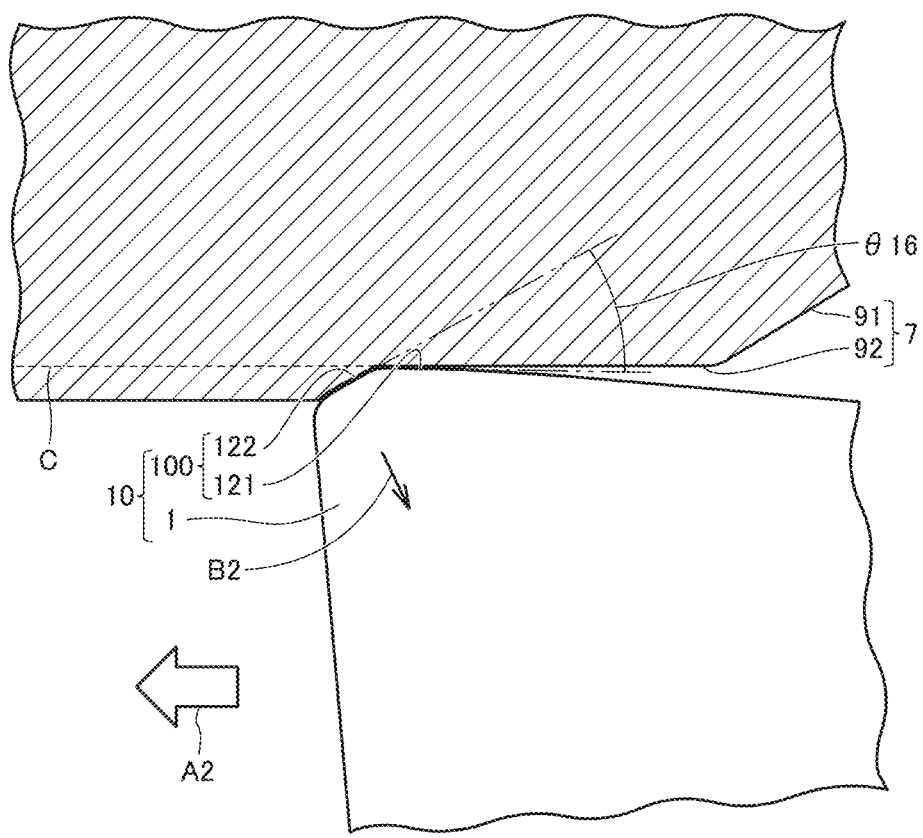
FIG. 21 is an enlarged schematic view of a region XXI in FIG. 19.

FIG. 21 is an enlarged schematic view of a region XXI in FIG. 19. As illustrated in FIG. 21, when parallel surface 92 of workpiece 7 parallel to rotation axis 8 is machined, second wiper edge portion 122 comes into contact with workpiece 7. Therefore, cutting insert 10 receives force in the direction perpendicular to the direction in which second wiper edge portion 122 extends. The direction of the force is the direction along an arrow B2. As second inclination angle θ16 between second wiper edge portion 122 and first wiper edge portion 121 is smaller, the direction in which second wiper edge portion 122 extends becomes closer to the direction parallel to parallel surface 92. Accordingly, the direction of arrow B2 is close to the direction perpendicular to rotation axis 8. In other words, in the force applied to cutting insert 10, the component in the direction perpendicular to rotation axis 8 increases. In other words, back component force applied to cutting insert 10 increases. Thus, vibration of cutting insert 10 increases during machining. That is, when second inclination angle θ16 is excessively decreased, the vibration of cutting insert 10 increases.

According to cutting insert 10 of the above embodiment, second inclination angle θ16 between second wiper edge portion 122 and first wiper edge portion 121 may be greater than or equal to 20°. Therefore, the vibration of cutting insert 10 can be prevented during machining.

According to cutting insert 10 of the above embodiment, third curvature radius R13 of first corner cutting edge 16 is smaller than second curvature radius R12 of second wiper edge portion 122. Fourth curvature radius R14 of first connection portion 123 is smaller than second curvature radius R12. Therefore, the cutting quality of each of first corner cutting edge 16 and first connection portion 123 is improved.

According to cutting insert 10 of the above embodiment, the shape of each of first surface 1 and second surface 2 is two-fold symmetry or three-fold symmetry about rotation center 145. Therefore, each of first surface 1 and second surface 2 can form two or three cutting edges. Therefore, when one cutting edge is worn, cutting can be performed using another cutting edge. This increases a life of cutting insert 10.

It should be understood that the embodiments disclosed herein is illustrative in all respects and are not restrictive. The scope of the present invention is defined not by the embodiments but by the claims, and is intended to include meanings equivalent to the claims and all modifications within the scope.

REFERENCE SIGNS LIST

1: first surface, 2: second surface, 3: outer peripheral side surface, 4: inner circumferential surface, 6: through-hole, 7: workpiece, 8: rotation axis, 10: cutting insert, 11: first straight portion, 12: second straight portion, 13: fifth straight portion, 14: sixth straight portion, 15: first wiper edge, 16: first corner cutting edge, 17: first corner portion, 21: third straight portion, 22: fourth straight portion, 23: seventh straight portion, 24: eighth straight portion, 25: second wiper edge, 26: second corner cutting edge, 27: second corner portion, 31: first side surface, 32: second side surface, 35: first wiper flank surface, 36: first corner flank surface, 37: corner side surface, 45: second wiper flank surface, 46: second corner flank surface, 51: thirteenth virtual straight line, 52: fourteenth virtual straight line, 71: first protrusion, 72: second protrusion, 73: third protrusion, 74: first inclined surface, 74a: first inclined portion, 74b: second inclined portion, 75: first rake surface, 76: first seating surface, 77: first breaker, 78: first land surface, 79: first recess, 81: fourth protrusion, 82: fifth protrusion, 83: sixth protrusion, 84: second inclined surface, 85: second rake surface, 86: second seating surface, 87: second breaker, 88: second land surface, 89: second recess, 91: tapered surface, 92: parallel surface, 100: first ridgeline, 110: first portion, 121: first wiper edge portion, 122: second wiper edge portion, 123: first connection portion, 131: first virtual straight line, 132: second virtual straight line, 133: third virtual straight line, 134: fourth virtual straight line, 135: fifth virtual straight line, 136: sixth virtual straight line, 141: first intersection point, 142: second intersection point, 143: third intersection point, 144: fourth intersection point, 145: rotation center, 151: first connection point, 152: second connection point, 153: third connection point, 154: fourth connection point, 155: fifth connection point, 161: fifteenth virtual straight line, 162: sixteenth virtual straight line, 200: second ridgeline, 210: second portion, 221: third wiper edge portion, 222: fourth wiper edge portion, 223: second connection portion, 231: seventh virtual straight line, 232: eighth virtual straight line, 233: ninth virtual straight line, 234: tenth virtual straight line, 235: eleventh virtual straight line, 236: twelfth virtual straight line, 241: fifth intersection point, 242: sixth intersection point, 243: seventh intersection point, 244: eighth intersection point, 251: sixth connection point, 252: seventh connection point, 253: eighth connection point, 254: ninth connection point, 255: tenth connection point, 261: seventeenth virtual straight line, 262: eighteenth virtual straight line, 301: first plane, 302: second plane, 321: first wiper flank portion, 322: second wiper flank portion, 323: first connection surface, 421: third wiper flank portion, 422: fourth wiper flank portion, 423: second connection surface, A1, A2, B1, B2: arrow, C: curve, R11: first curvature radius, R12: second curvature radius, R13: third curvature radius, R14: fourth curvature radius, R21: fifth curvature radius, R22: sixth curvature radius, R23: seventh curvature radius, R24: eighth curvature radius, θ11: first angle, θ12: second angle, θ13: third angle, θ14: fourth angle, θ15: first inclination angle, θ16: second inclination angle, θ19: ninth angle, θ21: fifth angle, θ22: sixth angle, θ23: seventh angle, θ24: eighth angle, θ25: third inclination angle, θ26: fourth inclination angle, θ31: tenth angle, θ41: eleventh angle

The invention claimed is:

1. A cutting insert comprising:
a first surface;
a second surface located opposite to the first surface; and
an outer peripheral side surface that is contiguous to each of the first surface and the second surface, wherein
a ridgeline between the first surface and the outer peripheral side surface forms a first ridgeline,
a ridgeline between the second surface and the outer peripheral side surface forms a second ridgeline,
the first ridgeline includes a first straight portion, a first wiper edge contiguous to the first straight portion, a first corner cutting edge located opposite to the first straight portion with the first wiper edge interposed therebetween, and a second straight portion contiguous to the first corner cutting edge, the second ridgeline includes a third straight portion, a second wiper edge contiguous to the third straight portion, a second corner cutting edge located opposite to the third straight portion with the second wiper edge interposed therebetween, and a fourth straight portion contiguous to the second corner cutting edge, the first ridgeline is located outward of the second ridgeline at the first corner cutting edge when viewed in a direction from the first surface toward the second surface, the second ridgeline is located outward of the first ridgeline at the second corner cutting edge when viewed in the direction from the first surface toward the second surface, the outer peripheral side surface includes a first wiper flank surface contiguous to the first wiper edge, a first corner flank surface contiguous to the first corner cutting edge, a second wiper flank surface contiguous to the second wiper edge, a second corner flank surface contiguous to the second corner cutting edge, a first plane contiguous to each of the first corner flank surface and the second wiper flank surface, and a second plane contiguous to each of the second corner flank surface and the first wiper flank surface, when viewed in the direction from the first surface toward the second surface, an outline formed by the first ridgeline and the second ridgeline that overlap each other is line-symmetric with respect to a bisector of an angle formed by a first virtual straight line extending in a direction in which the first straight portion extends and a second virtual straight line extending in a direction in which the second straight portion extends, when viewed in the direction from the first surface toward the second surface, a shape of each of the first surface and the second surface is two-fold or three-fold symmetric about a rotation center located on the bisector, each of the first plane and the second plane extends along a direction perpendicular to the direction from the first surface toward the second surface, the first wiper edge includes a first wiper edge portion contiguous to the first straight portion and a second wiper edge portion contiguous to the first corner cutting edge, when viewed in the direction from the first surface toward the second surface, the first wiper edge portion is inclined with respect to the first straight portion in a direction from the first straight portion toward the second straight portion, when viewed in the direction from the first surface toward the second surface, the second wiper edge portion is inclined with respect to the first wiper edge portion in a direction from the first wiper edge portion toward the second straight portion, each of the first wiper edge portion and the second wiper edge portion has an arc shape, and a curvature radius of the second wiper edge portion is smaller than a curvature radius of the first wiper edge portion.

2. The cutting insert according to claim 1, wherein the shape of each of the first surface and the second surface is two-fold symmetric about the rotation center when viewed in the direction from the first surface toward the second surface.

3. The cutting insert according to claim 2, wherein the angle formed by the first virtual straight line and the second virtual straight line is greater than or equal to 75° and less than or equal to 85°.

4. The cutting insert according to claim 1, wherein the shape of each of the first surface and the second surface is three-fold symmetric about the rotation center when viewed in the direction from the first surface toward the second surface.

5. The cutting insert according to claim 4, wherein the angle formed by the first virtual straight line and the second virtual straight line is greater than or equal to 75° and less than or equal to 85°.

6. The cutting insert according to claim 5, wherein
an inclination angle of the first wiper edge portion with respect to the first straight portion is greater than or equal to 2° and less than or equal to 10°, and
an inclination angle of the second wiper edge portion with respect to the first wiper edge portion is greater than or equal to 20° and less than or equal to 40°.

7. The cutting insert according to claim 1, wherein
the first wiper edge further includes a connection portion contiguous to each of the first wiper edge portion and the second wiper edge portion,
each of the first corner cutting edge and the connection portion has an arc shape,
a curvature radius of the first corner cutting edge is smaller than the curvature radius of the second wiper edge portion, and
a curvature radius of the connection portion is smaller than the curvature radius of the second wiper edge portion.

8. The cutting insert according to claim 3, wherein
an inclination angle of the first wiper edge portion with respect to the first straight portion is greater than or equal to 2° and less than or equal to 10°,
an inclination angle of the second wiper edge portion with respect to the first wiper edge portion is greater than or equal to 20° and less than or equal to 40°,
the first wiper edge further includes a connection portion contiguous to each of the first wiper edge portion and the second wiper edge portion,
each of the first corner cutting edge and the connection portion has an arc shape,
a curvature radius of the first corner cutting edge is smaller than the curvature radius of the second wiper edge portion, and
a curvature radius of the connection portion is smaller than the curvature radius of the second wiper edge portion.

9. The cutting insert according to claim 1, wherein
the first wiper flank surface is contiguous to each of the first plane and the second plane, and
the second wiper flank surface is contiguous to each of the first plane and the second plane.

10. The cutting insert according to claim 3, wherein
an inclination angle of the first wiper edge portion with respect to the first straight portion is greater than or equal to 2° and less than or equal to 10°, and
an inclination angle of the second wiper edge portion with respect to the first wiper edge portion is greater than or equal to 20° and less than or equal to 40°.

* * * * *